(12) United States Patent  (10) Patent No.: US 9,242,391 B2
Senior  (45) Date of Patent: Jan. 26, 2016

(54) SUSTAINABLE SIMULATED COMMODITY TROPICAL HARDWOOD PANEL

(71) Applicant: Green Rev LLC, Greensboro, NC (US)

(72) Inventor: Paul D. Senior, Greensboro, NC (US)

(73) Assignee: Greene Rev LLC, Greensboro, NC (US)

( * ) Notice: Subject to any disclaimer, the term of this patent is extended or adjusted under 35 U.S.C. 154(b) by 181 days.

(21) Appl. No.: 13/790,575

(22) Filed: Mar. 8, 2013

(65) Prior Publication Data

US 2013/0186518 A1    Jul. 25, 2013

Related U.S. Application Data

(62) Division of application No. 12/890,081, filed on Sep. 24, 2010, now Pat. No. 8,414,996.

(60) Provisional application No. 61/258,952, filed on Nov. 6, 2009.

(51) Int. Cl.
*B32B 37/16* (2006.01)
*B32B 38/04* (2006.01)
(Continued)

(52) U.S. Cl.
CPC . *B27D 1/04* (2013.01); *B32B 21/13* (2013.01); *B32B 21/14* (2013.01); *B44C 5/043* (2013.01);
(Continued)

(58) Field of Classification Search
CPC ........ B05D 1/18; B05D 2203/20; B05D 7/06; B05D 7/08; B05D 5/00; B05D 3/02; B05D 3/0272; B05D 3/0236; B05D 3/007; B05D 3/002; B05D 3/00; C09J 5/00; C09J 5/02; C09J 2400/303; B27D 1/00; B27D 5/00; B32B 2317/16; B32B 1/00; B32B 1/14; B32B 37/0038; B32B 38/14; Y10T 156/13; B44C 5/00; B44C 5/04; B44C 5/043; B44C 5/0469; B44C 1/00; B44C 1/005; B44F 9/00; B44F 9/02; B05C 3/00; B05C 3/02
USPC .......... 156/259, 263, 264, 265, 270; 144/346, 144/363
See application file for complete search history.

(56) References Cited

U.S. PATENT DOCUMENTS 3,205,111 A    9/1965  Williamson et al.
3,312,582 A    4/1967  Allan et al.
(Continued)

FOREIGN PATENT DOCUMENTS

EP    1275481 A2    1/2003
SU    1530449    * 12/1989    ............... B27K 5/02
(Continued)

OTHER PUBLICATIONS

European Search Report for EP Application No. 10190174.2, dated Nov. 20, 2013, 9 pgs.
(Continued)

*Primary Examiner* — Linda L Gray
(74) *Attorney, Agent, or Firm* — Womble Carlyle Sandridge & Rice, LLP

(57) ABSTRACT

A simulated commodity tropical hardwood-based panel includes an engineered veneer face including a first wood from one or more sustainable sources of wood. The face has a dyed coloring, a simulated grain, or a dyed coloring and a simulated grain that is substantially similar to the coloring, grain, or coloring and grain of a tropical hardwood veneer. The panel further includes a back and a core disposed between the face and back. The face, the core and back are stacked and adhered together to form a laminated panel. The face of the simulated commodity tropical hardwood-based panel has an appearance that is substantially similar to the appearance of the face veneer of a commodity tropical hardwood-based panel that includes the tropical hardwood veneer. The panel comprises no tropical hardwood from a non-sustainable source of wood.

5 Claims, 15 Drawing Sheets

(51) Int. Cl.
*B32B 21/14* (2006.01)
*B27D 1/04* (2006.01)
*B32B 21/13* (2006.01)
*B44C 5/04* (2006.01)
*B32B 37/12* (2006.01)
*B32B 38/14* (2006.01)
*B27K 5/02* (2006.01)

(52) U.S. Cl.
CPC . *B27K 5/02* (2013.01); *B32B 37/12* (2013.01); *B32B 38/14* (2013.01); *B32B 2317/16* (2013.01); *B32B 2479/00* (2013.01); *Y10T 156/1062* (2015.01); *Y10T 156/13* (2015.01); *Y10T 428/183* (2015.01); *Y10T 428/197* (2015.01); *Y10T 428/24066* (2015.01); *Y10T 428/24802* (2015.01)

(56) References Cited

U.S. PATENT DOCUMENTS

| | | | |
|---|---|---|---|
| 3,418,195 A | | 12/1968 | Allan |
| 3,963,546 A | | 6/1976 | Roberti |
| 4,208,369 A | * | 6/1980 | Kohn ................... 264/46.5 |
| 4,388,133 A | | 6/1983 | Hirao et al. |
| 4,465,539 A | | 8/1984 | Saihara et al. |
| 4,536,427 A | * | 8/1985 | Kohn ......................... 428/44 |
| 4,731,145 A | | 3/1988 | Senzani |
| 4,930,556 A | * | 6/1990 | Prihoda ..................... 144/347 |
| 4,942,084 A | * | 7/1990 | Prince ........................ 428/464 |
| 5,015,320 A | | 5/1991 | Abendroth et al. |
| 5,040,582 A | | 8/1991 | Hsu |
| 5,074,092 A | | 12/1991 | Norlander |
| 5,098,762 A | | 3/1992 | Nakajima |
| 5,145,537 A | | 9/1992 | Senzani |
| 5,362,520 A | | 11/1994 | Rodriguez |
| 5,418,034 A | | 5/1995 | McGuire, III |
| 5,942,008 A | | 8/1999 | Curto |
| 5,979,524 A | | 11/1999 | Trost |
| 6,298,888 B1 | | 10/2001 | Murai |
| 6,481,476 B1 | | 11/2002 | Okamoto |
| 6,497,937 B1 | | 12/2002 | Lam et al. |
| 6,757,058 B1 | | 6/2004 | Carman |
| 6,888,635 B2 | | 5/2005 | Lacovara |
| 6,913,049 B2 | | 7/2005 | Meyer et al. |
| 7,324,904 B2 | | 1/2008 | Floyd et al. |
| 7,347,912 B2 | | 3/2008 | Engel et al. |
| 2002/0031620 A1 | | 3/2002 | Yuzawa et al. |
| 2002/0038482 A1 | | 4/2002 | Mennicke et al. |
| 2007/0102108 A1 | | 5/2007 | Zheng et al. |
| 2007/0137323 A1 | | 6/2007 | Floyd et al. |
| 2007/0289709 A1 | * | 12/2007 | Chong et al. ............... 156/324.4 |
| 2008/0078473 A1 | | 4/2008 | Huang et al. |
| 2008/0156435 A1 | | 7/2008 | Kingma et al. |

FOREIGN PATENT DOCUMENTS

| | | |
|---|---|---|
| WO | 0066335 A1 | 11/2000 |
| WO | 03084760 A1 | 10/2003 |

OTHER PUBLICATIONS

Determination of Wood Panel Uniformity by Means of Optical Sensor Technology, Dr. Herman Van Dyk (Department of Wood and Paper Science), Aditya Ram Nataraj (Integrated Manufacturing Systems and Engineering Department), known at least as of Sep. 23, 2010, 30 pgs.
Forest Stewardship Council, FSC International Standard, FSC Principles and Criteria for Forest Stewardship, FSC-STD-01-001 (Version 4-0) EN, 1993, 13 pgs.
Forest Stewardship Council, FSC Standard, SLIMF Eligibility Criteria, FSC-STD-01-003 (Version 1-0) EN, Sep. 15, 2004, 5 pgs.
Forest Stewardship Council, FSC Standard, SLIMF Eligibility Criteria—Addendum, FSC-STD-01-003a EN, Feb. 24, 2010, 4 pgs.
Forest Stewardship Council, Structure and Content of Forest Stewardship Standards, FSC-STD-20-002 (Version 2-1), Nov. 30, 2004, 13 pgs.
Forest Stewardship Council, FSC International Standard, Structure, Content and Local Adaptation of Generic Forest Stewardship Standards, FSC-STD-20-002 (V3-0) EN, Aug. 31, 2009, 13 pgs.
Forest Stewardship Council, FSC Standard, Local Adaptation of Certification Body Generic Forest Stewardship Standards, FSC-STD-20-003 (Version 2-1) EN, Nov. 2004, 9 pgs.
Forest Stewardship Council, Forest Pre-evaluation Visits, FSC-STD-20-005 (Version 2-1), Nov. 30, 2004, 4 pgs.
Forest Stewardship Council, Stakeholder Consultation for Forest Evaluation, FSC-STD-20-006 (Version 2-1), Nov. 30, 2004, 7 pgs.
Forest Stewardship Council, FSC International Standard, Stakeholder Consultation for Forest Evaluations, FSC-STD-20-006 (V3-0) EN, Aug. 31, 2009, 12 pgs.
Forest Stewardship Council, FSC Standard, Forest Management Evaluation, FSC-STD-20-007 (Version 2-1) EN, Nov. 30, 2004, 19 pgs.
Forest Stewardship Council, FSC International Standard, Forest Management Evaluations, FSC-STD-20-007 (V3-0) EN, Aug. 31, 2009, 27 pgs.
Forest Stewardship Council, FSC International Standard, Forest Management Evaluations Addendum—Forest Certification Reports, FSC-STD-20-007a (V1-0) EN, Aug. 31, 2009, 14 pgs.
Forest Stewardship Council, FSC International Standard, Forest Management Evaluations Addendum—Forest Certification Public Summary Reports, FSC-STD-20-007b (V1-0) EN, Aug. 31, 2009, 8 pgs.
Forest Stewardship Council, FSC Standard, Forest Certification Reports, FSC-STD-20-008 (Version 2-1) EN, Nov. 30, 2004, 13 pgs.
Forest Stewardship Council, FSC Standard, Forest Certification Public Summary Reports, FSC-STD-20-009 (Version 2-4) EN, Nov. 30, 2004, 7 pgs.
Forest Stewardship Council, FSC Standard, Accreditation Standard for Chain of Custody Evaluations, FSC-STD-20-011 (Version 1-1) EN, Nov. 2007, 34 pgs.
Forest Stewardship Council, FSC Standard, Standard for Evaluation of FSC Controlled Wood in Forest Management Enterprises, FSC-STD-20-012 (Version 1-1) EN, Mar. 2007, 18 pgs.
Forest Stewardship Council, FSC Standard for Group Entities in Forest Management Groups, FSC-STD-30-005 (V1-0 Draft 2-0), May 5, 2009, 14 pgs.
Forest Stewardship Council, FSC Standard, FSC Controlled Wood Standard for Forest Management Enterprises, FSC-STD-30-010 (Version 2-0) EN, Oct. 4, 2006, 16 pgs.
Forest Stewardship Council, FSC Standard, Standard for Multi-site Certification of Chain of Custody Operations, FSC-STD-40-003 (Version 1-0) EN, Jun. 2007, 12 pgs.
Forest Stewardship Council, FSC Standard FSC Standard for Chain of Custody Certification, FSC-STD-40-004 (Version 2-0) EN, Nov. 2007, 26 pgs.
Forest Stewardship Council, Addendum to FSC Standards FSC-STD-40-004, FSC Product Classification, FSC-STD-40-004a (Version 1-0) EN, Dec. 20, 2007, 10 pgs.
Forest Stewardship Council, Addendum to FSC Standard FSC-STD-40-004, FSC Species Terminology FSC-STD-40-004b (Version 1-0) EN, Dec. 20, 2007, 25 pgs.
Forest Stewardship Council, FSC Standard, Standard for Company Evaluation of FSC Controlled Wood, FSC-STD-40-005 (Version 2-1) EN, Oct. 4, 2006, 28 pgs.
Forest Stewardship Council, FSC Standard, FSC Chain of Custody Standard for Project Certification, FSC-STD-40-006 (Version 1-0) EN, Jun. 2006, 13 pgs.
Forest Stewardship Council, FSC Standard, FSC Standard for Sourcing Reclaimed Material for Use in FSC Product Groups or FSC-certified Projects, FSC-STD-40-007 (Version 1-0) EN, Nov. 2007, 8 pgs.
Formaldehyde Emissions—Understanding the standards. Paper by Stephen Young, May 2004, 4 pgs.
ASTM E1333-10 Standard Test Method for Determining Formaldehyde Concentrations in Air and Emission Rates from Wood Products Using a Large Chamber, known at least as of Sep. 23, 2010, 4 pgs.

(56) References Cited

OTHER PUBLICATIONS

Kretschmann, et al., Effect of Various Proportions of Juvenile Wood on Laminated Veneer Lumber, Jul. 1993, 35 pages.
Website information from http://www.faqs.org/rulings/rulings1991HQ0088338.html, printed Sep. 15, 2009, 4 pages.
Busch, The Evolution of the Wood Panel, Interiors & Sources magazine, May 2009, 7 pages.
Ye, Wood Composite Made of Populus Plantation Material in China, technical report, 9 pages, known at least as early as Apr. 22, 2010.
Peterson, et al., Paper Birch Managers' Handbook for British Columbia, Mar. 1997, 44 pages.
Affre, et al., Looking Under the Veneer, Implementation Manual on EU Timber Trade Control: Focus on Cites-Listed Trees, Mar. 2004, 72 pages, Brussels.
Cites . . . and the Wood Products Trade . . . What you should know, pamphlet, Mar. 2001, 2 pages.
Convention on International Trade in Endangered Species of Wild Fauna and Flora, notes from the Second meeting of the Mahogany Working Group Belem (Brazil), Oct. 6-8, 2003, 3 pages.
Forest Stewardship Council, Controlled Wood, guide, 2007, 8 pages.
Global Forest & Trade Network, Newsletter, Apr. 2009, 12 pages.
WWF Guidelines for Investment in Operations that Impact Forests, Version 1.0, Sep. 2003, 59 pages.
MacQueen, et al., Distinguishing community forest products in the market: Industrial demand for a mechanism that brings together forest certification and fair trade, 2008, 123 pages, International Institute for Environment and Development, United Kingdom.
MacQueen, et al., Exploring fair trade timber: A review of issues in current practice, institutional structures and ways forward, 2006, 119 pages, International Institute for Environment and Development, United Kingdom.
ITTO Action Plan 2008-2011, ITTO Policy Development Series No. 18, 2008, 25 pages, ITTO.
Criteria and Indicators for Sustainable Management of Natural Tropical Forests, ITTO Policy Development Series No. 7, 1998, 28 pages, ITTO.
Criteria for the Measurement of Sustainable Tropical Forest Management, ITTO Policy Development Series No. 3, 8 pages, ITTO, Mar. 25, 1992.
ITTO Guidelines for the Establishment and Sustainable Management of Planted Tropical Forests, ITTO Policy Development 4, 1993, 45 pages, ITTO.
New Directions for Tropical Plywood: Proceedings of an ITTO/FAO International Conference on Tropical Plywood, Technical Series 26, 2006, 162 pages, ITTO.
Clausen, et al., Selecting Superior Yellow Birch Trees, guide, 13 pages, U.S.A., Dec. 31, 1967.
Waverley Council, NSW, The Good Wood Guide: A Residents Guide to Purchasing Environmentally Friendly Timber, 5 pages, known at least as early as Sep. 28, 2010.
Website information pages from http://www2.dpi.qld.gov.au/hardwoodsqld/1816.html, informational guide, printed May 31, 2009, 3 pages.
Brown, et al., World View of Plantation Grown Wood, report, 12 pages, Forestry Department, Food and Agriculture Organization of the United Nations (FAO), Viale delle Terme di Caracalla, Rome, Italy, known at least as early as Sep. 23, 2010.
Wilson, et al., Developing a forest resource on industrial cutaway peatland: The BOGFOR programme, 2008, 192 pages, COFORD, National Council for Forest Research and Development, Dublin, Ireland.
Forest Products Special, various articles, 2005, 109 pages, vol. 5.
Cameron, Managing birch woodlands for the production of quality timber, article, 1996, 1 page, printed from http://forestry.oxfordjournals.org/cgi/content/abstract/69/4/357.
Acker, et al., Cost Action E44 Conference in Milan on: A European Wood Processing Strategy: Future Resources Matching Products and Innovations, May 30 and Jun. 2-3, 2008, 160 pages, Milan, Italy.

Wooden, et al., Lake States Woodlands: Aspen Management, report, 1996, 6 pages, University of Wisconsin System Board of Regents, U.S.A.
Castro, et al., New Technologies and Alternative Uses for Poplar Wood, report, 2006, 10 pages, Italy.
Castro, et al., Cost Action E44 Final Conference in Milan on: A European Wood Processing Strategy: Future Resources Matching Products and Innovations: Poplar cultivation in Italy: history, state of the art, perspectives, 14 pages, Italy, known at least as early as Sep. 23, 2010.
Verani, et al., International Poplar Commission Thematic Papers: Field Handbook—Poplar Harvesting, Working Paper IPC/8, 2008, 60 pages, Forestry Department: Food and Agriculture Organization of the United Nations.
Poplars, Willows and People's Wellbeing: Publications Listed in Country Progress Reports, 23rd Session of the International Poplar Commission, Beijing, China, FAO Working Paper IPC/7, Oct. 2008, 80 pages.
A&F Wood Products, Inc., guide and specifications of products, 14 pages, U.S.A., known at least as early as Sep. 23, 2010.
Sanded Plywood, product guide, 1999, 16 pages, APA—The Engineered Wood Association.
Website information pages from http://www.alibaba.com/product-free/101370642/Bb_Cc_Plywood_Okoume_Plywood_Bintangor_Plywood_Red_Hardwood_Plywood_..., printed Sep. 1, 2009, 4 pages, Sep. 1, 2009.
Fascination Veneer, brochure, 11 pages, DanzerEuropeVeneer, known at least as early as Sep. 23, 2010.
Website Information pages from http://www.greenlineforest.com/pages/manufacturing2.html, L4 Natural Dyed Wood Veneers, printed Aug. 27, 2009, 3 pages.
Plywood Panel Siding, chapter 4 in Wood: Detailing for Performance, 30 pages, known at least as early as Sep. 23, 2010.
Cora Lam : HPL laminate with wood decorative surface., brochure, 9 pages, Italy, known at least as early as Sep. 23, 2010.
Core Prex: Engineered wood veneer, brochure, 15 pages, Italy, known at least as early as Sep. 23, 2010.
Vicwood Group: Engineered Wood, 8 pages, Vicwood Development Ltd., Hong Kong, Mar. 22, 2006.
Vicwood Group: Flooring Collection, 12 pages, Vicwood Industry (Suzhou) Co., Ltd., China, known at least as early as Sep. 23, 2010.
Forest Products Laboratory, Forest Service U.S Department of Agriculture, Bleaching Wood, research report, 9 pages, known at least as early as Sep. 23, 2010.
Bleaching (a shortened version of an article published in Ullmann's Encyclopedia of Industrial Chemistry by Wiley-VCH Verlag GmbH & Co. KGaA in 2006, written by Hans Ulrich Suss, Degussa AG, Hanau, Germany), 10 pages.
Mitigation of the UV-driven discolouration of reconstituted and dyed veneers, report, Jan. 2008, 106 pages, project No. PNo7.2036, Forest and Wood Products Australia Limited, Australia.
ITTO Action Plan—Criteria and Priority Areas for Programme Development and Project Work, International Tropical Timber Organization, Ninth Session, Yokohama, Nov. 16-23, 1990, 26 pgs.
Pureview, Huntsman—Enriching Lives Through Innovation, Jul. 2009, 17 pgs.
Utsugi, et al., International Association of Societies of Design Research—The Hong Kong Polytech NIC University, Nov. 12-15, 2007, Visual Character of Board-Formed Environment Consious Materials, 15 pgs.
U.S. Department of Commerce Technology Administration, National Institute of Standards and Technology, Voluntary Product Standard, PS 1-95, Construction and Industrial Plywood, Mar. 1996, 49 pgs.
ALPI Divisione LEGNO, Technical data of Alpilignum decorative multilaminar veneer, compiled Jan. 18, 2008, 3 pages.
Agnolotti, et al., Adding more value to tropical plywood by innovative products (article), International Tropical Timber Organization, 4 pages, known at least as early as Sep. 23, 2010.
Material Explorer, description of Alpi Concept and photos of samples, 4 pages, known at least as early as Sep. 23, 2010.
Material Explorer, description of Alpikord Range 1 and photos of samples, 4 pages, known at least as early as Sep. 23, 2010.

(56) References Cited

OTHER PUBLICATIONS

Material Explorer, description of Alpilignum Bamboo and photos of samples, 4 pages, known at least as early as Sep. 23, 2010.
Webpage from http://www.alpi.it/uk/Articolo.asp?IdArt=103 showing information on ALPI headquarters, printed on Aug. 26, 2009, 1 page.
Website informational pages from http://www.alpi.it/uk/Articolo.asp?IdArt=118 about the Alpilignum Production Process, printed on Aug. 26, 2009, 2 pages.
Website informational pages from http://www.alpi.it/uk/dovesiamo.asp on how to contact ALPI headquarters in Modigliana, Italy, printed Aug. 26, 2009, 2 pages.
Echo Wood Reconstituted Real Wood Veneer Specification Sheet (general informational handout), Sep. 2008, 5 pages.
Echo Wood: Facts & Specifications (informational handout), known at least as early as Sep. 23, 2010.
Echo Wood (product information and printouts of samples); 3 pages, known at least as early as Sep. 23, 2010.
Hardwoods Specialty Products (informational chart); 1 page, known at least as early as Sep. 23, 2010.
Website informational pages from http://www.hardwoods-inc.com/green_eco_friendly.aspx about Hardwoods Echo Wood Eco Wood Green Echo-Friendly, Echowood Bamboo and Echo-wood Wood Veneers, printed Aug. 28, 2009, 10 pages.
Website informational pages from http://www.hardwoods-inc.com/products.aspx?subnav=Id7-ef818af20b7b about Hardwoods Hardwoods Dragon Ply Echowood Rely-A-Form Hardwood Lumber Plywood Overylay Products, printed Aug. 28, 2009, 6 pages.
Plywood Association of Australia (PAA), Plywood 'The Only Engineered Wood Panel' (informational sheets); 3 pages, known as early as Sep. 23, 2010.
EWPAA, Featuring Plywood in Buildings, article, 23 pages, Australia, known at least as early as Sep. 23, 2010.
Dorries, Formaldehyde Emissions from Plywood and Laminated Veneer Lumber, article, 7 pages, Australia, known at least as early as Sep. 23, 2010.
Plywood Association of Australia, Ltd., Technical Information, 85 pages, Australia, known at least as early as Sep. 23, 2010.
EWPAA, Plywood Manufacture: An introduction in the manufacture of plywood, including veneer manufacture, plywood fabrication and LVL, brochure, 11 pages, known at least as early as Sep. 23, 2010.
EWPAA, Product and Specification Guide for the Professional and Home Handyperson, brochure, 20 pages, known at least as early as Sep. 23, 2010.
EWPAA, Informational handout on Veneer Manufacture, Plywood Manufacture and Plywood Adhesives, 6 pages, known at least as early as Sep. 23, 2010.
Hardwood Plywood Handbook, handbook, 2004, 70 pages, Hardwood Plywood Veneer Association, USA.
Veneer Species Guide, handbook, 2006, 79 pages, Hardwood Plywood Veneer Association, USA.
American National Standard for Hardwood and Decorative Plywood, handbook, 2004, 54 pages, Hardwood Plywood & Veneer Association, USA.
Voluntary Standard for Sliced Decorative Wood Face Veneer, informational guide, original publication date Jan. 5, 1996, 13 pages, Hardwood Plywood & Veneer Association, USA.
Greenline, Fineline Veneer Manufacturing Process, brochure, 3 pages, know at least as early as Sep. 23, 2010.
Castro, et al., Multilaminar wood: Manufacturing process and main physical-mechanical properties, article in Forest Products Journal, 2004, 7 pages, vol. 54, No. 2, Forest Products Society.
Website informational pages from Greenline, How to Specify Greenline Fineline Reconstituted Wood Veneers, printed Aug. 26, 2009, 2 pages.
Greenline, Engineered Wood Veneer and Natural Dyed Wood Veneer, catalog, 12 pages, known at least as early as Sep. 23, 2010.
Greenline, Cross-Reference Guide, 1 page, known at least as early as Sep. 23, 2010.
Website information pages from http://www.greenlineforest.com/pages/reconstituted.html, printed Aug. 27, 2009, 3 pages.
Website information pages from http://www.greenlineforest.com/pages/specify_veneers2.html, How to Specify Greenline L4 Natural Dyed Veneers, printed Aug. 27, 2009, 2 pages.
Website information pages from http://www.greenlineforest.com/pages/specify_veneers.html, How to Specify Greenline Fineline Reconstituted Wood Veneers, printed Aug. 27, 2009, 2 pages.
Website information pages from http://www.greenlineforest.com/pages/sustainable2.html, An Endangered Earth, printed Aug. 27, 2009, 2 pages.
Website information pages from http://www.greenlineforest.com/pages/technical.html, Greenline L4 Natural Dyed Wood Veneers, printed Aug. 27, 2009, 2 pages.
Website information pages from http://www.greenlineforest.com/pages/veneer_intro.html, printed Aug. 27, 2009, 2 pages.
Website information pages from http://www.blueridgesales.ca/qs/page/5672/5666/-1, Manufacturers Agent of Premium Wood Products, printed Aug. 26, 2009, 8 pages.
Website information pages from http://www.greenlineforest.com/pages/sustainable.htm, An Endangered Earth, printed Aug. 27, 2009, 2 pages.
Ipir Reconstituted Wood Veneers—Forest Collection as printed from http://www.greenlineforest.com/pages/reconstituted.html, 29 pages, known at least as early as Sep. 23, 2010.
IPIR, Source and Supply of Sustainable Raw Material, letter, Sep. 27, 2006, 1 page.
Winandy, et al., United States Department of Agriculture, Using Wood Composites as a Tool for Sustainable Forestry, Proceedings of Scientific Session 90, XXII IUFRO World Congress, General Technical Report, 2005, 100 pages.
Chunquan, et al., China's Wood Market, Trade and the Environment, report, 2004, 81 pages, Science Press USA Inc, and WWF International, Beijing, China.
Kun, et al., Demand and Supply of Wood Products in China, report, 2007, 77 pages, Food and Agriculture Organization of the United Nations, Rome, Italy.
FSC Standard: FSC Chain of Custody Standard for Companies Supplying and Manufacturing FSC-Certified Products, 2004, 28 pages, Forest Stewardship Council, A.C., Bonn, Germany.
FSC Principles and Criteria for Forest Stewardship, 2004, 11 pages, Forest Stewardship Council, A.C.
Hain, et al., FSC Group Certification Toolkit, 2005, 77 pages.
Competitiveness of Tropical Timbers at the US Market, general overview, 9 pages, known at least as early as Sep. 23, 2010.
Evans, et al., Guide to Participatory Tools for Forest Communities, 2006, 43 pages, Center for International Forestry Research, Indonesia.
Stewart, et al., Good practice guidelines for High Conservation Value assessments: A practical guide for practitioners and auditors, 2008, 48 pages, ProForest, United Kingdom.
Website information pages from http://www2.ffpri.affrc.go.jp/fdb/esawoodq/Def.html, Definition of Properties, printed Sep. 7, 2009, 3 pages.
Smith, et al., Competitiveness of Forest Products at Global Markets' with Particular Emphasis on Tropical Forest Products and on Small and Medium Scale Producers; Market Review in the U.S. of Selected Timber Products, report, Jan. 23, 2008, 38 pages.
ITTO Action Plan 2008-2011, report, 2008, 25 pages, ITTO Policy Development Series No. 18, Japan.
Nussbaum, et al., Modular Implementation and Verification (MIV): a toolkit for the phased application of forest management standards and certification, guide, Nov. 2003, 95 pages, United Kingdom.
North American forest products market crash spreads throughout UNECE region; Green building combats climate change, press release, Oct. 29, 2008, 9 pages, Geneva.
Bull, Plantations: Facts and Figures, presentation, Sep. 9, 2004, 25 pages, Vancouver, Canada.
Watershed: People's Forum on Ecology; periodical; 2004, 60 pages, vol. 9, No. 3 Mar.-Jun. 2004, Towards Ecological Recovery and Regional Alliance (TERRA), Bangkok, Thailand.

(56) References Cited

OTHER PUBLICATIONS

Responsible management of planted forests Voluntary guidelines; Planted Forests and Tree Working Paper FP37E, 84 pages, Rome, Italy, known at least as early as Sep. 23, 2010.
White, et al., Responsible Purchasing of Forest Products (second edition), guide, Jul. 2006, 58 pages, WWF International/World Wildlife Fund for Nature.
Focus, magazine, Jul./Aug. 2004, 8 pages, Issue #39, London.
Practitioner's Guide to the Implementation of the IPF Proposals for Action, Second Revised Edition, May 1999, 104 pages.
Website information pages from http://en.wikipedia.org/wiki/sustainable_forest_management, Sustainable forest management, printed Sep. 7, 2009, 6 pages.
Global Forest Resources Assessment Update 2005: Terms and Definitions (final version), Working Paper 83, 2004, 36 pages, Rome, Italy.
Mendoza, et al., Guidelines for Applying Multi-Criteria Analysis to the Assessment of Criteria and Indicators, The Criteria & Indicators Toolbox Series, 82 pages, Center for International Forestry Research (CIFOR), Indonesia, know at least as early as Sep. 23, 2010.
Tropical Timber Market Report, 2009, 22 pages, vol. 14, No. 16, ITTO.
United Nations General Assembly, Non-legally binding instrument on all types of forests, Oct. 22, 2007, 10 pages.
Unit 1.01.00—Temperate and boreal silviculture, 5 pages, known at least as early as Sep. 23, 2010.
Winady, et al., United States Department of Agriculture, Using Wood Composites as a Tool for Sustainable Forestry, Proceedings of Scientific Session 90, XXII IUFRO World Congress, General Technical Report, 2005, 100 pages.
Ye, Wood Composite Made of Populus Plantation Material in China, general technical report, 9 pages, known at least as early as Sep. 23, 2010.
Duke, et al., Biodiversity and Environmental Assessment Toolkit, Mar. 2000, 65 pages.
WWF Guidelines for Investment Operations that Impact Forests, Version 1.0, Sep. 2003, 59 pages.
Website information pages from http://www.acfairbankconsulting.ca/vicwoodfaq.htm, Frequently Asked Questions About Vicwood, printed Aug. 31, 2009, 10 pages.
Ipir Reconstituted Wood Veneers—Forest Collection, pp. 1-29 from http://www.greenlineforest.com/pages/reconstituted.html, known at least as early as Sep. 23, 2010.
Lamlnex Timber Veneers, brochure, 15 pages, know at least as early as Sep. 23, 2010.
Material Explorer, description of Decora and printouts of samples, 4 pages, known at least as early as Sep. 23, 2010.
Material Explorer, description of Casaleno and printouts of samples, 4 pages, known at least as early as Sep. 23, 2010.
Material Explorer, description of Mafi Fresco and printouts of samples, 4 pages, known at least as early as Sep. 23, 2010.
Material Explorer, description of Oval Nimbus and printouts of samples, 4 pages, known at least as early as Sep. 22, 2010.
Wood and Articles of Wood; Wood Charcoal; Cork and Articles of Cork; Manufacturers of Straw, of Esparto or of Other Plaiting Materials; Basketware and Wickerwork, 24 pages, known at least as early as Sep. 23, 2010.
Daniels, United States Trade in Wood Products, 1978-2005, General Technical Report, May 2008, 67 pages.
Daniels, United States Trade in Wood Products, 1978-2005, General Technical Report, May 2008, 71 pages.
United Nations Conference on Trade and Development, Trade and Development Report: Responding to the Global Crisis, Climate change mitigation and development, 2009, 218 pages, United Nations Publication, New York and Geneva.
Website information pages from http://www.canply.org/english/products/comparison/comparison_all.htm, 12 pages, known at least as early as Sep. 23, 2010.
Harmonized Tariff Schedule of the United States (2009)—Supplement 1; Wood and Articles of Wood; Wood Charcoal; Cork and Articles of Cork; Manufacturers of Straw, of Esparto or of Other Plaiting Materials; Basketware and Wickerwork,31 pages.
Wang, The Development of China's Forestry Sector and the Opportunities for Canada, journal, Sep. 2009, 53 pages, Foreign Policy for Canada's Tomorrow, No. 6, Canadian International Council.
Mace, Global Commodity Chains, Alternative Trade and Small-Scale Coffee Production in Oaxaca, Mexico (Masters Thesis), 1998, 42 pages.
Ince, et al., Globalization and World Trade, chapter 13 in Resource and Market Projections for Forest Policy Development, edited by Darius Adams and Richard Haynes, 2007, 31 pages, Springer, The Netherlands.
World Customs Organization, Glossary of International Customs Terms, May 2006, 30 pages, World Customs Organization, Belgium.
Harmonized Tariff Schedule of the United States (2009)—Supplement 1, Effective Feb. 1, 2009; Wood and Articles of Wood; Wood Charcoal; Cork and Articles of Cork; Manufacturers of Straw, of Esparto or of Other Plaiting Materials; Basketware and Wickerwork,31 pages.
The Brussels Definition of Value and The Gatt Valuation Agreement: A Comparison, 42 pages, Feb. 26, 1985, Brussels.
United Nations Conference on Trade and Development, The Feasibility of a Tropical Plywood Futures Contract, Apr. 1, 1998, 62 pages.
US Census Bureau, Hardwood Veneer and Plywood Manufacturing: 2002 Economic Census, Jan. 2005, 46 pages.
Acquah, et al., The Potential for Ghana's Wood/Wood Products in the U.S. Market, May 1998, 140 pages.
Butterworth, et al., Gain Report: China, Peoples Republic of Solid Wood Products Annual 2005, Jul. 15, 2005, 27 pages.
Achilles, Gain Report: Germany, Solid Wood Products Annual 2006, Dec. 14, 2006, 23 pages.
Bromokusumo, Gain Report: Indonesia, Solid Wood Products Annual 2006, Jun. 28, 2006, 14 pages.
Phillips, et al., Gain Report: Korea, Republic of, Solid Wood Products Annual 2006, Jun. 19, 2006, 33 pages.
Lozano, Gain Report: Mexico, Solid Wood Products, Mexico Announces Final Rule for Wood Packaging Materials Effective Sep. 16, Feb. 28, 2005, 5 pages.
Leister, Gain Report: South Africa, Republic of, Exporter Guide Annual Report, Jul. 14, 2005, 21 pages.
AgExporter—The Monthly Magazine for Food and Agricultural Exporters, Apr. 2003, 20 pages.
High-End U.S. Wood Products Make Music . . . and More . . . In Indonesia, AgExporter (magazine), Apr. 2003, 3 pages.

* cited by examiner

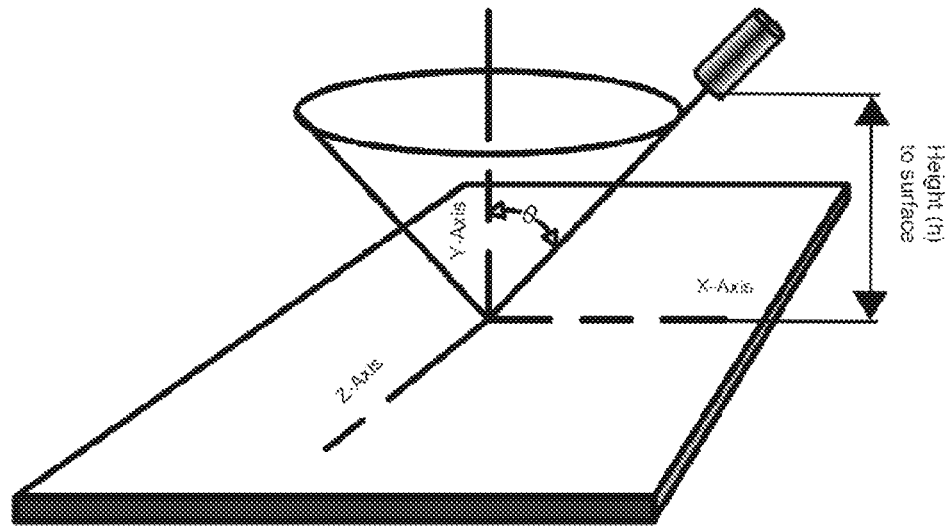
FIG. 15A (range of angle "θ" of measurement with respect to the normal to a sample)
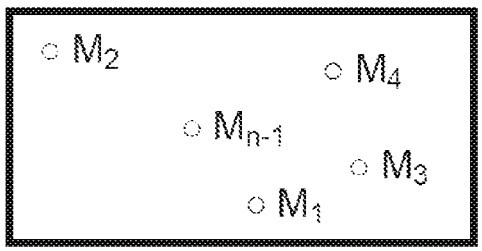
FIG. 15B (simple random sampling)
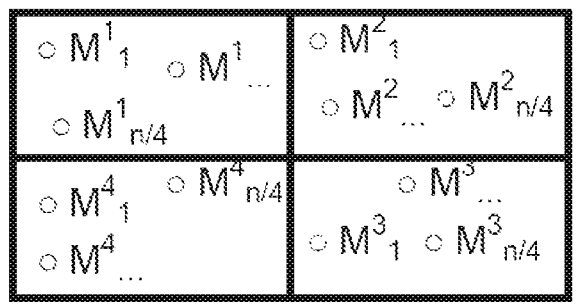
FIG. 15C (stratified simple random sampling)

US 9,242,391 B2

SUSTAINABLE SIMULATED COMMODITY TROPICAL HARDWOOD PANEL

CROSS RELATION TO PRIOR APPLICATIONS

This patent application is a divisional of U.S. patent application Ser. No. 12/890,081, filed Sep. 24, 2010, which claims the benefit of priority to U.S. Provisional Application No. 61/258,952, filed Nov. 6, 2009 which is incorporated herein by reference in its entirety.

FIELD OF THE INVENTION

The present invention relates to plywood panels that are alternatives to commodity tropical hardwood-based panels that include wood from non-sustainable tropical sources. More particularly, the invention relates to a simulated commodity tropical hardwood-based panel that has an engineered face veneer produced from wood from one or more sustainable sources of wood and has the simulated appearance of a tropical hardwood veneer.

BACKGROUND OF THE INVENTION

Some plywood panels used in the construction industry, furniture industry, cabinet industry, and the like commonly include one or more plies of tropical hardwoods. One example of such a plywood panel is Lauan plywood. Lauan plywood is typically used for non-decorative applications such as flooring underlayment, internal or hidden portions of furniture and cabinetry, and the like. Lauan plywood and similar plywoods are a commodity product sold by lumber supply wholesalers and retailers. Traditionally, Lauan plywood panels and other similar plywood panels include one or more tropical hardwood plies produced from wood harvested from tropical forests located in tropical regions such as Indonesia and Malaysia. Such tropical forests have become increasingly vulnerable to the adverse consequences of environmentally destructive tree harvesting practices. Such harvesting practices can lead to severe soil erosion, increased incidents of illegal logging, and poor soil fertility, for example.

For these reasons, substantial efforts are being made to significantly reduce or eliminate the importation and sale of products that contain tropical hardwoods harvested from endangered tropical forests. In particular, there is a demand for substitute wood products that include little or no wood from endangered tropical forests, and instead include wood from sustainable sources of wood (the term "sustainable source(s) of wood" is defined below). Accordingly, there is a need for hardwood plywood panels that include no tropical hardwoods from endangered tropical forests and instead include wood from one or more sustainable sources of wood. More specifically, there is a need for a simulated commodity tropical hardwood-based panel that includes no tropical hardwood from non-sustainable wood sources, yet has the visual appearance of the tropical hardwood panel that it replaces. Preferably, purchasers and users of such a simulated commodity tropical hardwood-based panel would have difficulty differentiating between the simulated commodity tropical hardwood-based panel and a commodity tropical hardwood-based panel that it replaces.

SUMMARY OF THE INVENTION

The present invention satisfies these and other needs by providing a simulated commodity tropical hardwood-based panel that includes no wood from a non-sustainable source of wood. In one embodiment, a simulated commodity tropical hardwood-based panel includes an engineered veneer face including a first wood from one or more sustainable sources of wood. The face can have a dyed coloring, simulated grain, or dyed coloring and simulated grain that is substantially similar to the coloring, grain or coloring and grain of a tropical hardwood veneer. The panel can further include a back and a core disposed between the face and back. The face, the core and back can be stacked and adhered together to form a laminated panel. The face of the simulated commodity tropical hardwood-based panel can have an appearance that is substantially similar to the appearance of a face veneer of a commodity tropical hardwood-based panel that includes a tropical hardwood veneer. The panel includes no tropical hardwood from a source of wood that is not sustainable.

In another embodiment, the invention includes a method of producing a simulated commodity tropical hardwood-based panel. The method can include the steps of cutting a face veneer from wood from one or more sustainable sources of wood, and whitening, dyeing, or whitening and dyeing the face veneer such that the face veneer has a coloring, a simulated grain, or a coloring and simulated grain that is substantially similar to the coloring, grain, or coloring and grain of a selected tropical hardwood veneer. The method can further include adhering the face veneer and two or more wood plies that include one or more hardwoods from one or more sustainable sources of wood to form a laminated panel.

In another embodiment, the invention includes a plywood panel having an engineered face veneer including a hardwood from one or more sustainable sources of wood. The face veneer can be whitened, dyed, or whitened and dyed to have an appearance that is substantially similar to the appearance of a face veneer of a commodity tropical hardwood-based plywood panel.

The invention also includes a laminate structure that includes a face, a core, a back (that may also be referred to as a series of plies) and an adhesive deposited between the plies and securing the plies together. The face, core, and back (each ply) may each have a desired thickness, which may be the same or different. The face can include an engineered veneer having a simulated grain substantially running along either a desired length of the simulated commodity tropical hardwood-based laminate structure or a desired width of the simulated commodity tropical hardwood-based laminate structure. Each of the face, core, and back (each ply) can include one or more hardwoods including one or more non-tropical species, one or more plantations species, or one or more non-tropical plantations species, or combinations thereof.

A simulated commodity tropical hardwood-based panel according to various aspects and embodiments of the present invention may be provided in a sustainable manner at substantially the same cost or at a lower cost than the cost of a commodity tropical hardwood-based panel for which the simulated commodity tropical hardwood-based panel is an alternative. To that end, a simulated commodity tropical hardwood-based panel according to various aspects and embodiments of the present invention includes wood from one or more sustainable sources of wood, and includes no wood from a source of wood that is not sustainable.

As used herein, the term "engineered veneer" generally means a veneer material produced from wood, generally without using computer assisted design stimulation, by cutting wood to a thickness of about 0.1 mm-0.4 mm followed by whitening and dyeing. Engineered veneers typically emulate only a color of natural wood species or colors of fantastic or nonexistent wood species. Engineered veneers may be provided at mass produced levels for commoditized consumption. Textures of engineered veneers typically are substantially homogeneous and/or nondescript. Colors of engineered veneers can be artificially controlled. Discoloration, knots, and wormholes inherent to natural veneers can be avoided. Engineered veneer might be used in the non-decorative areas of furniture, sub-flooring, boards, windows, doors, and arts & crafts.

As used herein, the term "fancy engineered veneer" generally means a decorative veneer material produced from wood, generally using computer assisted design stimulation, by cutting wood to a thickness of about 0.1 mm-0.4 mm followed by whitening and dyeing. Fancy engineered veneers can be made to emulate the morphology and color of natural wood species as well as the texture and color of fantastic or nonexistent wood species. Fancy engineered veneers are provided at custom levels for individualized consumption. Textures and colors of fancy engineered veneers can be artificially controlled. Discoloration, knots, and wormholes inherent to natural veneers can be avoided, if desired. Fancy engineered veneer is commonly used in the area of furniture, decoration, flooring, decorative boards, windows, doors, sporting goods, wood sculpture, and arts & crafts, and typically is exposed to view in its final application.

As used herein, the terms "sustainable source of wood" and "sustainable sources of wood" generally mean a source of wood or sources of wood (hereinafter source or sources) that encourage an efficient use of the multiple products and services of the source or sources to strive toward economic viability while considering environmental benefits and social benefits. In striving toward economic viability, environmental, social, and operational costs of production may be taken into account while ensuring the investments that could be necessary to maintain the ecological productivity of the source or sources. Operations would encourage an optimal use and local processing of the source's or sources' diversity of products. Management would encourage minimizing waste associated with harvesting and on-site processing operations while striving to avoid damage to other resources of the source or sources. Management could strive to strengthen and diversify the local economy, avoiding dependence on a single product from the source or sources. Management operations could recognize, maintain, and where appropriate, enhance the value of services and resources of the source or sources such as watersheds and fisheries. A rate of harvest of wood products would not exceed levels which can be permanently sustained for the source or sources. To that end, a source or sources of wood that would comply or comply with "Principle #5: Benefits from the forest" [FSC-STD-01-001 (Apr. 2004) FSC Principles and Criteria for Forest Stewardship approved by the Forest Stewardship Council (FSC) General Assembly on the 9 Dec. 2005] come within the meaning of the terms "sustainable source of wood" and "sustainable sources of wood". It follows that a source or sources of wood that would comply or comply with FSC-STD-01-001 (Apr. 2004) FSC Principles and Criteria for Forest Stewardship approved by the Forest Stewardship Council (FSC) General Assembly on the 9 Dec. 2005 come within the meaning of the terms "sustainable source of wood" and "sustainable sources of wood". Also, a source or sources of wood that would comply or comply with FSC-STD-40-005 (Version 2-1) EN FSC standard for company evaluation of FSC Controlled Wood having an effective date of the 1 Jan. 2007 for primary manufacturers and the 1 Jan. 2008 for secondary manufacturers as well as small enterprises come within the meaning of the terms "sustainable source of wood" and "sustainable sources of wood". Furthermore, a source or sources of wood that would comply or comply with FSC-STD-40-004 (Version 1-0) EN FSC chain of custody standard for companies supplying and manufacturing FSC-certified products adopted by the Forest Stewardship Council (FSC) having an effective date of the 1 Oct. 2004 (Note: All new FSC chain of custody certification applicants will be evaluated against FSC-STD-40-004 (Version 1-0) FSC standard from 1 Jan. 2006. All FSC chain of custody certificate holders are required to comply with FSC-STD-40-004 (Version 1-0) FSC standard by 1 Jan. 2007) are within the meaning of the terms "sustainable source of wood" and "sustainable sources of wood". Furthermore, a source or sources of wood that would comply or comply with one or more of Forest Stewardship Council standards (FSC-STD) listed in the Table 1 below come within the meaning of the terms "sustainable source of wood" and "sustainable sources of wood". The above standards and those listed in the Table 1 below are hereby incorporated by reference.

TABLE 1

Forest Stewardship Council Standards (FSC-STD)

| Standard | Version | Title | Approval/Finalization Date | Effective Date |
|---|---|---|---|---|
| FSC-STD-01-001 | 4-0 | FSC Principles and Criteria | 2005-12-09 | |
| FSC-STD-01-003 | 1-0 | Small and Low Intensity Managed Forests (SLIMF) eligibility criteria | 2004-11-30 | 2006-02-16 |
| FSC-STD-01-003a | 2009-08-31 | Small and Low Intensity Managed Forests (SLIMF) eligibility criteria addendum | 2009-05-15 | |
| FSC-STD-20-002 | 2-1 | Structure and content of Forest Stewardship Standards | 2004-11-30 | 2006-01-01 |
| FSC-STD-20-002 | 3-0 | Structure, content and local adaptation of generic forest stewardship standards | 2009-08-31 | 2010-01-01 |
| FSC-STD-20-003 | 2-1 | Local adaptation of generic Forest Stewardship Standards | 2004-11-30 | 2005-01-01 |
| FSC-STD-20-005 | 2-1 | Forest pre-evaluation visits | 2004-11-30 | 2005-01-01 |
| FSC-STD-20-006 | 2-1 | Stakeholder consultation for forest evaluation | 2004-11-30 | 2005-01-01 |

TABLE 1-continued

Forest Stewardship Council Standards (FSC-STD)

| Standard | Version | Title | Approval/Finalization Date | Effective Date |
|---|---|---|---|---|
| FSC-STD-20-006 | 3-0 | Stakeholder consultation for forest evaluation | 2009-08-31 | 2010-01-01 |
| FSC-STD-20-007 | 2-1 | Forest management evaluation | 2004-11-30 | 2005-01-01 |
| FSC-STD-20-007 | 3-0 | Forest management evaluations | 2009-08-31 | 2010-01-01 |
| FSC-STD-20-007a | 1-0 | Forest management evaluations addendum - forest certification reports | 2009-08-31 | 2010-01-01 |
| FSC-STD-20-007b | 1-0 | Forest management evaluations addendum - forest certification public summary reports | 2009-08-31 | 2010-01-01 |
| FSC-STD-20-008 | 2-1 | Forest certification reports | 2004-11-30 | 2005-01-01 |
| FSC-STD-20-009 | 2-1 | Forest Certification Public summaries | 2004-11-30 | 2005-01-01 |
| FSC-STD-20-011 | 1-1 | Chain of Custody (CoC) evaluations | 2007-11-09 | 2008-01-01 |
| FSC-STD-20-012 | 1-1 | Standard for evaluation of FSC Controlled Wood in Forest Management (FM) Enterprises | 2007-09-14 | 2007-09-14 |
| FSC-STD-30-005 | 1-0 | Standard for group entities in forest management groups | 2009-08-31 | 2010-01-01 |
| FSC-STD-30-010 | 2-0 | FSC Controlled Wood standard for FM enterprises | 2006-10-04 | 2007-01-01 |
| FSC-STD-40-003 | 1-0 | Multi-site Certification for Chain of Custody Operations | 2007-06-29 | 2009-01-01 |
| FSC-STD-40-004 | 2-0 | FSC Standard for Chain of Custody (CoC) certification | 2007-11-09 | 2008-01-01 |
| FSC-STD-40-004a | 1-0 | FSC Product classification | 2007-12-20 | 2008-01-01 |
| FSC-STD-40-004b | 1-0 | FSC Species terminology | 2007-12-20 | 2008-01-01 |
| FSC-STD-40-005 | 2-1 | FSC standard for company evaluation of controlled wood | 2007-04-01 | 2007-04-01 |
| FSC-STD-40-006 | 1-0 | FSC CoC standard for Project Certification | 2006-06-29 | 2006-07-01 |
| FSC-STD-40-007 | 1-0 | FSC Standard for Sourcing Reclaimed Material for Use in FSC Product Groups or FSC-certified Projects | 2007-11-09 | 2008-01-01 |
| FSC-STD-60-006 | 1-1 | Process Requirements for the Development and Maintenance of Forest Stewardship Standards | 2009-04-01 | |

As used herein, the term "commodity" generally refers to a wood product that is interchangeable with another wood product of the same type or grade. The wood product may be used as inputs in the production of other goods, such as consumer products, or services. The quality of a given wood product may differ slightly, but it may essentially be uniform and/or undifferentiated between producers. As it may be undifferentiated, a commodity wood product may be characterized by a low profit margin, as distinguished from branded wood products. Investors may buy or sell a commodity wood product through futures contracts. The price of a commodity wood product may be subject to supply and demand. When traded on an exchange, commodity wood products typically must meet specified minimum standards, known as a basis grade. Examples of commodity wood products may be found among those of Chapter 44 (Wood and Articles of Wood; Wood Charcoal), Section IX (Wood and Articles of Wood; Wood Charcoal; Cork And Articles Of Cork; Manufacturers of Straw, of Esparto or of Other Plaiting Materials; Basketware and Wickerwork) of the Harmonized Tariff Schedule of the United States (2009)—Supplement 1 (Effective 2009-02-01), and include those of Heading/SubHeading:

4408 (Sheets for veneering of a thickness not exceeding 6 mm);
4410 (Particle board, oriented strand board (OSB) and similar board);
4411 (Medium density fiberboard (MDF));
4412 (Plywood, veneered panels and similar laminated wood); and
4418 (Builders' joinery and carpentry of wood, including cellular wood panels and assembled flooring panels; shingles and shakes).

Chapter 44, Section IX of the Harmonized Tariff Schedule of the United States (2009)—Supplement 1 (Effective 2009-02-01) is herein incorporated by reference.

Aspects of embodiments and embodiments of the present invention relate to a simulated commodity tropical hardwood-based panel including one or more temperate hardwoods, one or more boreal hardwoods, or combinations thereof. According to some aspects, the face includes a temperate hardwood or a boreal hardwood.

According to other aspects of the invention, a simulated commodity tropical hardwood-based panel, aside from its face, includes a wood selected from any one of an aspen (*Populus* spp.), a birch (*Betula* spp.), a eucalyptus (*Eucalyptus* spp.), a gmelina (*Gmelina arborea*), a pine (*Pinus* spp.), a yellow poplar (*Liriodendron* spp.), a poplar (*Populus*), or a combination thereof.

According to other aspects, a simulated commodity tropical hardwood-based panel includes a face including an engineered veneer configured to simulate a coloring of a tropical hardwood selected from any one of an acajou d'afrique (*Khaya* spp.), alan (*Shorea* spp.), an andiroba (*Carapa guianensis*), a balau (*Manilkara bidentata*), a bintangor (*Calophyllum* spp.), a canarium (*Canarium* spp.), a cativo (*Prioria copaifera*), a cedro (*Cedrela* spp.), a dark red meranti (*Shorea* spp.), a framire (*Terminalia ivorensis*), a fromager (*Ceiba pentandra*), a fuma (*Ceiba pentandra*), geronggang (*Cratoxylon arborescens*), an ilomba (*Pycnanthus angolensis*), a jequitiba (*Cariniana pyriformis* and *Cariniana* spp.), a kapur (*Dryobalanops* spp.), a kempas (*Koompassia malaccensis*), a keruing (*Dialium* spp.), a light red meranti (*Shorea* spp.), a limba (*Terminalia superba*), a mengkulang (*Heritiera* spp., syn. *Tarrietia* spp.), a mersawa (*Anisoptera* spp.), a nyatoh (*Palaquium* spp. and *Payena* spp.), obeche (*Triplochiton scleroxylon*), an okoume (*Aucomea klaineana*), a quaruba (*Vochysia* spp.), a sapelli (sapele) (*Entandrophragma cylindricum*), a sipo (*Entandrophragma utile*), a tiama (*Entandrophragma angolense*), a virola (*Dialyanthera* spp.), a white lauan (*Pentacme contorta*.), a white meranti (*Shorea* spp.), a white seraya (*Parashorea* spp.), and a yellow meranti (*Shorea* spp.), or combination thereof.

According to other aspects, a simulated commodity tropical hardwood-based panel includes a face including a wood selected from any one of an aspen (*Populus* spp.), a poplar (*Populus*), a birch (*Betula* spp.), a eucalyptus (*Eucalyptus* spp.), a gmelina (*Gmelina arborea*), and a pine (*Pinus* spp.), or combination thereof. In yet other aspects, a simulated commodity tropical hardwood-based panel includes a face including a poplar (*Populus*), a birch (*Betula* spp.) or a combination thereof.

According to some aspects and embodiments of the present invention, a face of a simulated commodity tropical hardwood-based panel can include any one of:
(a) a within face visual consistency as quantified using the coefficient of variation ($c_v$) of color based on random sampling less than a within face visual consistency as quantified using the coefficient of variation ($c_v$) of color based on random sampling of a veneer which the face was configured to simulate;
(b) a within face visual consistency as quantified using the coefficient of variation ($c_v$) of contrast based on random sampling less than a within face visual consistency as quantified using the coefficient of variation ($c_v$) of contrast based on random sampling of a veneer which the face was configured to simulate;
(c) a within face visual consistency as quantified using the coefficient of variation ($c_v$) of luminous intensity ($I_v$) based on random sampling less than a within face visual consistency as quantified using the coefficient of variation ($c_v$) of luminous intensity ($I_v$) based on random sampling of a veneer which the face was configured to simulate;
(d) a within face visual consistency as quantified using the coefficient of variation ($c_v$) of color based on stratified random sampling less than a within face visual consistency as quantified using the coefficient of variation ($c_v$) of color based on stratified random sampling of a veneer which the face was configured to simulate;
(e) a within face visual consistency as quantified using the coefficient of variation ($c_v$) of contrast based on stratified random sampling less than a within face visual consistency as quantified using the coefficient of variation ($c_v$) of contrast based on stratified random sampling of a veneer which the face was configured to simulate;
(f) a within face visual consistency as quantified using the coefficient of variation ($c_v$) of luminous intensity ($I_v$) based on stratified random sampling less than a within face visual consistency as quantified using the coefficient of variation ($c_v$) of luminous intensity ($I_v$) based on stratified random sampling of a veneer which the face was configured to simulate; or
(g) any combination of two or more of the preceding.

According to some other aspects and embodiments of the present invention, a face of a simulated commodity tropical hardwood-based panel can include any one of:
(i) a within face visual consistency as quantified using the coefficient of variation ($c_v$) of color based on random sampling less than a within face visual consistency as quantified using the coefficient of variation ($c_v$) of color based on random sampling of a fancy engineered veneer configured to simulate tropical hardwood;
(ii) a within face visual consistency as quantified using the coefficient of variation ($c_v$) of contrast based on random sampling less than a within face visual consistency as quantified using the coefficient of variation ($c_v$) of contrast based on random sampling of a fancy engineered veneer configured to simulate tropical hardwood;
(iii) a within face visual consistency as quantified using the coefficient of variation ($c_v$) of luminous intensity ($I_v$) based on random sampling less than a within face visual consistency as quantified using the coefficient of variation ($c_v$) of luminous intensity ($I_v$) based on random sampling of a fancy engineered veneer configured to simulate tropical hardwood;
(iv) a within face visual consistency as quantified using the coefficient of variation ($c_v$) of color based on stratified random sampling less than a within face visual consistency as quantified using the coefficient of variation ($c_v$) of color based on stratified random sampling of a fancy engineered veneer configured to simulate tropical hardwood;
(v) a within face visual consistency as quantified using the coefficient of variation ($c_v$) of contrast based on stratified random sampling less than a within face visual consistency as quantified using the coefficient of variation ($c_v$) of contrast based on stratified random sampling of a fancy engineered veneer configured to simulate tropical hardwood;
(vi) a within face visual consistency as quantified using the coefficient of variation ($c_v$) of luminous intensity ($I_v$) based on stratified random sampling less than a within face visual consistency as quantified using the coefficient of variation ($c_v$) of luminous intensity ($I_v$) based on stratified random sampling of a fancy engineered veneer configured to simulate tropical hardwood; or
(vii) any combination of two or more of the preceding.

According to other aspects of the invention, a simulated commodity tropical hardwood-based panel may have a thickness or desired thickness from about 2 mm to about 30 mm (about 5/64" to 1 3/16"), Examples of thicknesses, without limitation, include (a) the metric sizes of about 2 mm, about 2.4 mm, about 2.7 mm, about 3.2 mm, about 3.6 mm, about 4 mm, about 5.2 mm, about 5.5 mm, about 6 mm, about 6.5 mm, about 9 mm, about 12 mm, about 15 mm, about 18 mm, and about 21 mm to about 30 mm; and (b) the standard or inch sizes of about 1/12", about 1/4", about 5/16", about 3/8", about 7/16", about 1/2", about 9/16", about 5/8", about 11/16", about 3/4", about 13/16", about 7/8", about 15/16", about 1", about 1 1/8", and about 1 3/16". Also, according to those or other aspects, a simulated commodity tropical hardwood-based panel may have a length or desired length from about 1220 mm to about 3660 mm (about 4' to about 12') and a width or desired width from about 610 mm to about 2440 mm (about 2' to about 8').

According to other aspects and embodiments of the present invention, a simulated commodity tropical hardwood-based panel may have a face of an engineered veneer including a plurality of elongated wood strips with each wood strip having a thickness from about 0.1 mm to about 0.8 mm (about 1/256" to 7/256"). A simulated commodity tropical hardwood-based panel may also include a face having a thickness from about 0.1 mm to about 0.8 mm (about 1/256" to 7/256").

According to further aspects or embodiments of the present invention, a simulated commodity tropical hardwood-based panel may have a face that includes an engineered veneer having a plurality of elongated wood strips including wood grain with each wood grain in each of the wood strips extending substantially along a length of the strip. Also according to these or other aspects, a simulated commodity tropical hardwood-based panel may have a face including an engineered veneer having a plurality of elongated wood strips bonded to each other by means of an adhesive. In further aspects, a simulated commodity tropical hardwood-based panel may have a face including an engineered veneer having a plurality of elongated wood strips bonded to each other by means of an adhesive matched to the color of the wood whereby the joints between the wood strips are substantially invisible. It will be appreciated that a face that includes an engineered veneer may be a solid unitary structure. Further, it will be appreciated that a face that includes an engineered veneer may include a plurality of elongated wood strips, each of the strips comprising a sufficient length to substantially extend continuously along (a) the desired length of the simulated commodity tropical hardwood-based laminate structure or (b) the desired width of the simulated commodity tropical hardwood-based laminate structure. Moreover, it will be appreciated that a face that includes an engineered veneer may be a plurality of elongated wood strips comprising wood grain, and the wood grain in each of the wood strips can substantially extend along the lengths of the strips.

Accordingly, some aspects and embodiments of the present invention provide a simulated commodity tropical hardwood-based panel including a laminate structure, a generally cuboidal shape, and one or more hardwoods. The laminate structure can include a face, a core, an adhesive deposited between the face and the core that secures the face and the core together, a back, and an adhesive deposited between the core and the back that secures the core and the back together. The generally cuboidal shape has a desired length, a desired width, and a desired thickness. The one or more hardwoods can include one or more non-tropical species, one or more plantations species, or one or more non-tropical plantations species, or combinations thereof. At least the face of the simulated tropical hardwood-based panel includes a surface defined by the desired length and the desired width of the panel and composed substantially entirely of edge-grain. Also, the face can include a plurality of elongated wood strips each having exposed edge-grain along at least one edge. The wood strips may be arranged in substantially parallel stacked relationship to one another such that the surface is collectively formed by the edges of the plurality of strips.

Other aspects and embodiments of the present invention provide a simulated commodity tropical hardwood-based panel comprising a laminate structure comprised of a series of plies including a face, plies having a desired thickness, one or more hardwoods, and an adhesive deposited between the plies and securing the plies together. The face can include an engineered veneer of a simulated grain substantially running along either a desired length of the simulated commodity tropical hardwood-based laminate structure or a desired width of the simulated commodity tropical hardwood-based laminate structure. Each of the plies can include one or more hardwoods including one or more non-tropical species, one or more plantations species, or one or more non-tropical plantations species, or combinations thereof.

Still other aspects and embodiments of the present invention provide a simulated commodity tropical hardwood-based panel that includes a laminate wood structure in the form of a board including a face, a desired length, a desired width of lesser dimension than the desired length, a desired thickness of lesser dimension than the desired width, and one or more hardwoods. The face can include a plurality of elongated wood strips having a length, a width, and a thickness. The length substantially equals one of either (a) the desired length of the laminate wood structure or (b) the desired width of the laminate wood structure. The thickness can be substantially uniform. An adhesive may be deposited between the elongated wood strips. The substantially uniform thickness and either the wood strip length or the wood strip width can define an edge including exposed edge-grain. The adhesive bonds the elongated wood strips to each other in a substantially parallel stacked relation such that the edges of the wood strips are substantially co-planar with one another so as to form a surface composed substantially of edge grain. The face can include a sufficient number of the elongated wood strips so that the totality of the substantially uniform thicknesses of the wood strips and thickness of the adhesive deposited therebetween is substantially equal to the other of either (a) the desired length of the laminate wood structure and (b) the desired width of the laminate wood structure. The one or more hardwoods can include one or more non-tropical species, one or more plantations species, or one or more non-tropical plantations species, or combinations thereof.

Numerous other aspects of embodiments, embodiments, features, and advantages of the present invention will be apparent from the following detailed description and the accompanying drawings. In the description and/or the accompanying drawings, reference is made to exemplary aspects of embodiments and/or embodiments of the invention which can be applied individually or combined in any way with each other. Such aspects of embodiments and/or embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of the present invention will become apparent from the following detailed description, the accompanying drawings, and the appended claims.

BRIEF DESCRIPTION OF DRAWINGS

FIG. 15A is a schematic diagram showing a process for visually characterizing a face of a laminate structure including an engineered veneer face according to certain aspects and embodiments of the invention.

FIG. 15B is a schematic diagram showing an example of a simple random sampling pattern for use in visually characterizing a face of a laminate structure including an engineered veneer face according to certain aspects and embodiments of the invention.

FIG. 15C is a schematic diagram illustrating an example of a stratified simple random sampling for use in visually characterizing a face of a laminate structure including an engineered veneer face according to certain aspects and embodiments of the invention.

DETAILED DESCRIPTION OF THE INVENTION

Figure 1A:
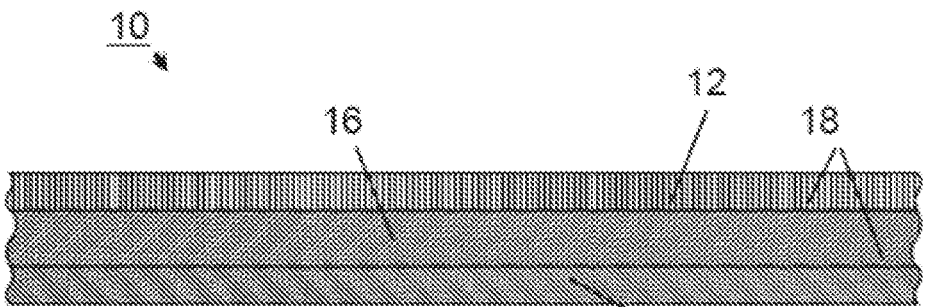
FIG. 1A is a cross-sectional view of a laminate structure according to one embodiment of the invention.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIGS. 1A-11C in particular, it will be understood that the illustrations are for the purpose of describing certain aspects and embodiments of the invention and are not intended to limit the invention thereto.

Figure 1B:
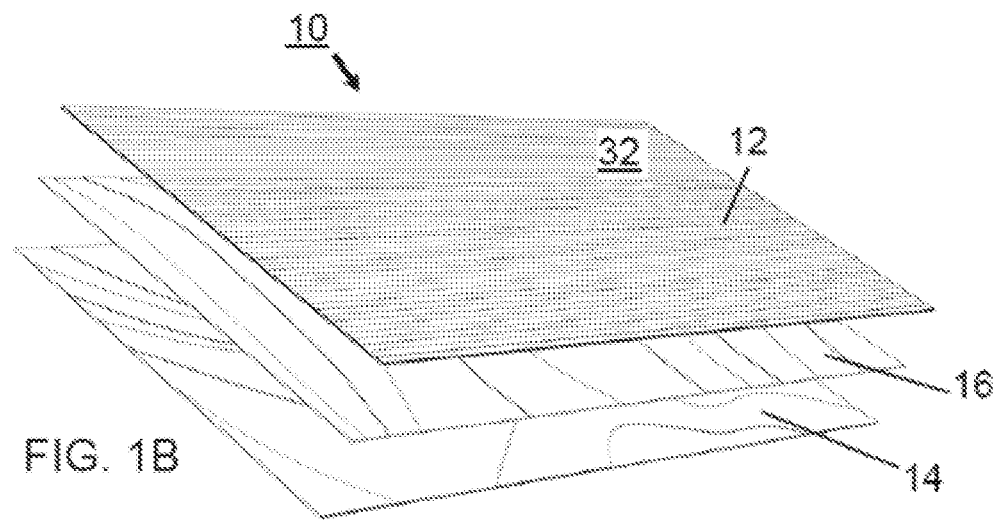
FIG. 1B is an exploded perspective view of the laminate structure of FIG. 1A.
Figure 1C:
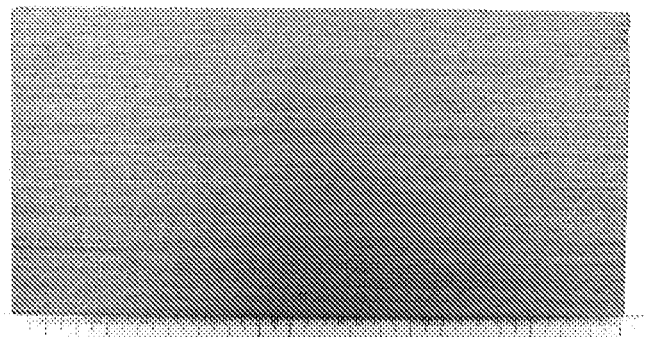
FIG. 1C is a photograph illustrating a face of a laminate structure according to one embodiment of the invention.

FIGS. 1A, 1B, and 6A-10B show a laminate structure (generally designated by reference numeral 10) of a simulated commodity tropical hardwood-based panel according to the invention. Such a laminate structure includes a face 12, a back 14 and a core 16 therebetween. The face 12 includes an engineered veneer 32. The back 14 may or may not be an engineered veneer 32. When not comprised of an engineered veneer 32, back 14 may be a veneer 24. The core 16 of the laminate structure 10 may be a single layer as depicted in FIGS. 1A-1B or the core 16 may be a plurality of core members or plies, such as, core members or plies 16A and 16B of FIGS. 7A-7B; core members or plies 16A, 16B, and 16C of FIGS. 8A-8B; core members or plies 16A, 16B, 16C, and 16D of FIGS. 9A-9B; and core members or plies 16A, 16B, 16C, 16D, and 16E of FIGS. 10A-10B. Between the face 12 and the core 16 is an adhesive 18, Likewise, between the core 16 and the back 14 is an adhesive 18, FIG. 1B illustrates an exploded view of the laminate structure of FIG. 1A. As can be seen, the face 12 comprised of the engineered veneer 32 and the back 14 sandwich a core 16. FIG. 1C presents a photograph illustrating an example of a face 12 of an engineered veneer 32 on a laminate structure 10 made according to aspects of the embodiments of the present invention. Those skilled in the art, after having been exposed to and/or having studied the aspects of embodiment and embodiments of the present invention, will appreciate the structure of elongated wood strips in a substantially parallel stacked relation in photograph FIG. 1C. Also indicated in FIG. 1A are a thickness (Tf) of the face 12, a thickness (Tb) of the back 14, a thickness (Tc) of the core 16, and the overall thickness (Tls) of the laminate structure 10. The thicknesses (Tls) of the laminate structures 10 may be any value and is not limited to nominal commercial thicknesses, such as, (a) the metric sizes of about 2 mm, about 2.4 mm, about 2.7 mm, about 3.2 mm, about 3.6 mm, about 4 mm, about 5.2 mm, about 5.5 mm, about 6 mm, about 6.5 mm, about 9 mm, about 12 mm, about 15 mm, about 18 mm, and about 21 mm to about 30 mm; and/or (b) the standard or inch sizes of about 1/12", about 1/4", about 5/16", about 3/8", about 7/16", about 1/2", about 9/16", about 5/8", about 11/16", about 3/4", about 13/16", about 7/8", about 15/16", about 1", about 1 1/8", and about 1 3/16". Also, according to those or other aspects, a simulated commodity tropical hardwood-based panel may have a length or desired length from about 1220 mm to about 3660 mm (about 4' to about 12') and a width or desired width from about 610 mm to about 2440 mm (about 2' to about 8'). Additionally, those skilled in the art, after having been exposed to and/or having studied the aspects of embodiment and embodiments of the present invention, will appreciate that the sum of the thickness (TO of the face 12, a thickness (Tc) of the core 16, and the thickness (Tb) of the back 14, are substantially equal to the thickness (Tls) of the laminate structure 10.

Figure 2:
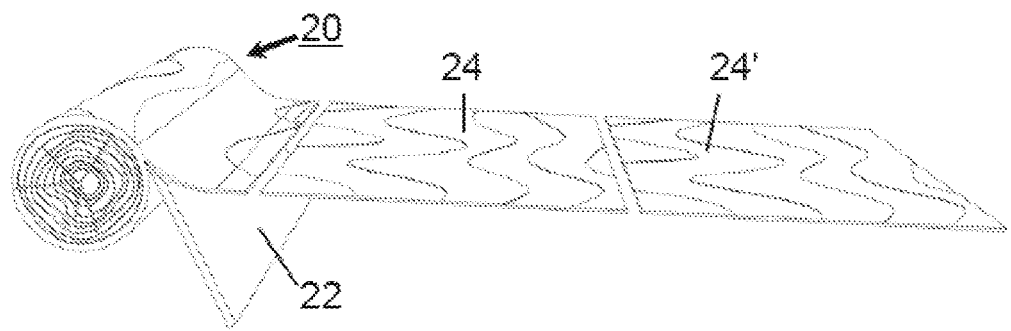
FIG. 2 is a perspective view illustrating a process of peeling a log to produce a veneer for use in a laminate structure according to one embodiment of the invention.
Figure 3:
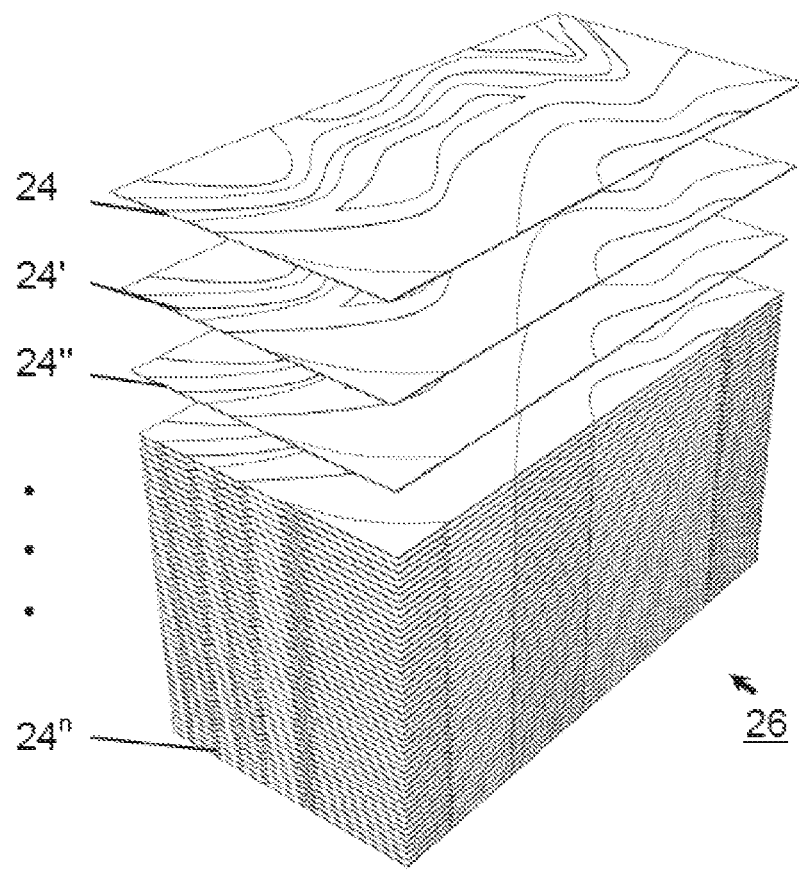
FIG. 3 is an exploded perspective view of a veneer log or flitch according to certain aspects or embodiments of the invention.
Figure 4:
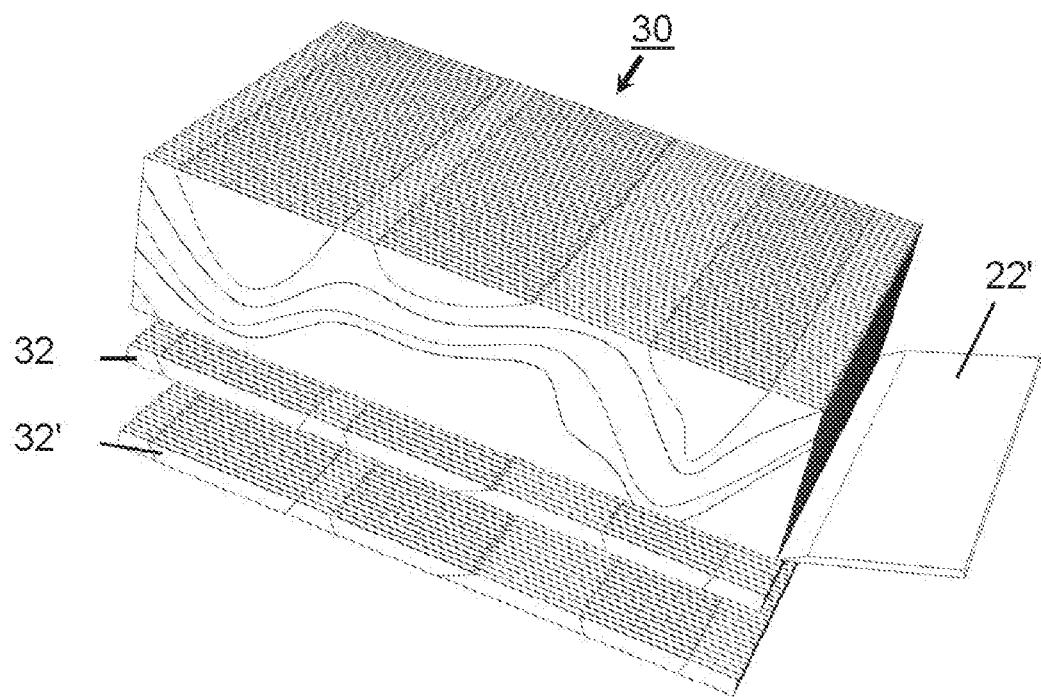
FIG. 4 is a perspective view illustrating a portion of a process for slicing a veneer log or flitch to make an engineered veneer according to certain aspects and embodiments of the invention.
Figure 5:
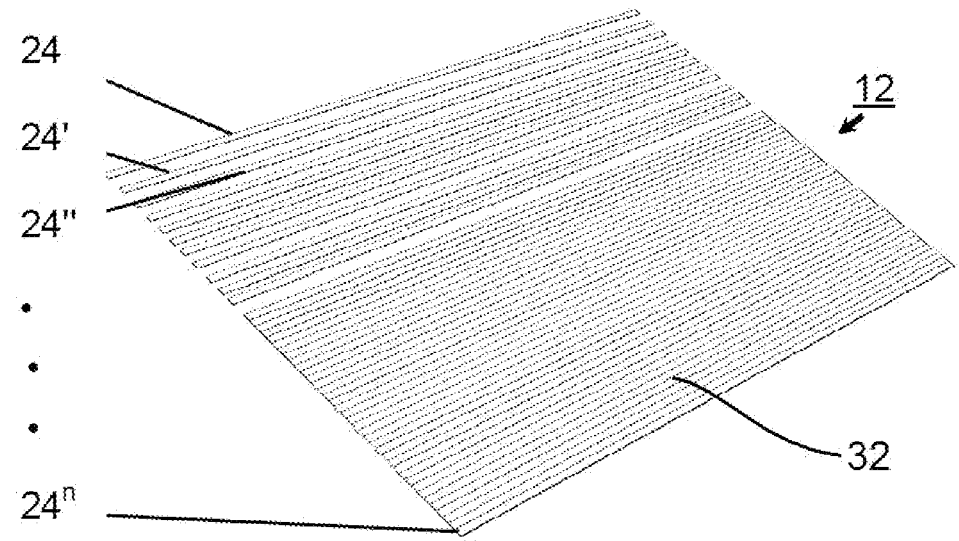
FIG. 5 is an exploded perspective view of an engineered veneer constructed of elongated wood strips according to certain aspects and embodiments of the invention.

FIGS. 2-4 illustrate portions of processes for producing a plurality of veneers 24, 24', 24", . . . 24" usable in a laminate structure 10 and/or an engineered veneer 32 according to aspects and embodiments of the present invention. As shown in FIG. 2, a log or flitch 20 of a non-tropical species or a plantation species is placed in a commercially available piece of equipment so as to cut veneers 24, 24', 24", . . . 24" therefrom. Those skilled in the art, after having been exposed to and/or having studied the aspects of embodiment and embodiments of the present invention, will appreciate that veneers 24, 24', 24", . . . 24" may be cut by any one of rotary peeling, quarter cut slicing, crown or flat cut slicing, half-round slicing, sawing, or combination thereof. In particular, the diagram of FIG. 2 illustrates rotary peeling a log or flitch 20 using a knife 22 to produce a plurality of veneers 24, 24'. As the diagram of FIG. 2 illustrates, these veneers 24, 24' and additional veneers 24", . . . 24" may then be combined into a set of multiple veneers 26. Between adjacent veneers 24, 24'; veneers 24', 24"; . . . and veneers $24^{n-1}$, $24^n$ of the set of multiple veneers 26 is placed an adhesive 18. The set of multiple veneers 26 is then subjected to force using the platens of a press for a prescribed time, at a prescribe temperature to create a veneer log or flitch 30. In turn, the veneer log or flitch 30 is sliced using a knife 22 to create engineered veneers 30, 30'. As the diagram of FIG. 5 illustrates, the engineered veneer 32 is comprised of elongated wood strips in a substantially parallel stacked relation (i.e., transverse cross-sections of veneers 24, 24', 24", . . . 24" sliced from the log or flitch 20).

Those skilled in the art, after having been exposed to and/or having studied the aspects of embodiment and embodiments of the present invention, will appreciate that an adhesive 18, according to aspects of embodiments and embodiments of the present invention, preferably includes an adhesive having negligible or low formaldehyde emissions (LFE). Information developed by numerous organizations for other wood-based panels has consistently shown that formaldehyde emission associated with phenolic resin is extremely low. Results from other wood-based panels have shown that formaldehyde emissions may be near the minimum levels detectable by formaldehyde emission testing that have been established (e.g. JAS F****, DIN El, or EN Release Class A). Likewise, a laminate structure 10 bonded with phenol formaldehyde also may have negligible formaldehyde emissions, and therefore such laminate structures 10 may be certified to PS1-07 which would be deemed to be exempt from California Air Resources Board (CARB) requirements.

A phenol formaldehyde is a two component synthetic adhesive. For example, phenol (with the chemical formula $C_6H_5OH$) is reacted with formaldehyde (with the chemical formula $CH_2O$) at temperatures of about 652° C. to produce a thermosetting (heat hardening) resin. This resin is a new chemical entity that possesses properties that are completely distinct from those of either phenol or formaldehyde, with the formaldehyde converted to stable methylene linkages which do not break down under exterior end use conditions. Typically, a phenolic resin may be supplied to a wood-based panel manufacturer in a water solution premixed with a catalyst (caustic soda). Soda ash and bulking ingredients called fillers and extenders (e.g., bark and wheat flours) may be added to improve adhesive characteristics of the mix. Alternatively, other types of adhesives may also be used as the adhesive material 18.

Laminate structures 10 may be manufactured by bonding face 12, core 16, and back 14 with a phenolic resin adhesive mix, and polymerizing (e.g., curing or hardening) the adhesive in a "hot press". The hot press would subject laminate structure 10 to temperature of about 150° C. (300° F.) and a pressure of about 1.4 MPa (200 psi), resulting in an inert water and boil-proof bond.

As noted, information developed by numerous organizations has consistently shown that formaldehyde emission associated with phenolic resin-bonded wood-based panels is extremely low. This is attributable to characteristics of the adhesive and polymerization of the resin during the manufacturing process (described previously). Formaldehyde emission testing of laminate structure 10 may be conducted by various accredited laboratories, using internationally accepted test procedures such as:

ASTM E1333-90 "Large Chamber";
Japanese JAS "Desiccator";
European Standard EN 120 "Perforator"; or
DIN 52368/EN 717 "Gas-analysis".

Laminate structure 10 manufactured with phenol formaldehyde adhesive may qualify for the low formaldehyde emitting materials credit in the Leadership in Energy and Environmental Design (LEED) Building Rating System, and also may be exempt from the California Air Resources Board's (CARB) regulations controlling formaldehyde emissions from composite wood products.

Those skilled in the art, after having been exposed to and/or having studied the aspects of embodiment and embodiments of the present invention, will appreciate that in using an engineered veneer 32 as a face 12 according to aspects of embodiments and embodiments of the present invention, a laminate structure 10 may be characterized as having more consistent visual characterization within the board of laminate structure.

According to some aspects and embodiments of the present invention, a face 12 of a simulated commodity tropical hardwood-based panel may include any one of:

(a) a within face 12 visual consistency as quantified using the coefficient of variation ($c_v$) of color based on random sampling less than a within face 12 visual consistency as quantified using the coefficient of variation ($c_v$) of color based on random sampling of a veneer which the face 12 was configured to simulate;

(b) a within face 12 visual consistency as quantified using the coefficient of variation ($c_v$) of contrast based on random sampling less than a within face 12 visual consistency as quantified using the coefficient of variation ($c_v$) of contrast based on random sampling of a veneer which the face 12 was configured to simulate;

(c) a within face 12 visual consistency as quantified using the coefficient of variation ($c_v$) of luminous intensity ($I_v$) based on random sampling less than a within face 12 visual consistency as quantified using the coefficient of variation ($c_v$) of luminous intensity ($I_v$) based on random sampling of a veneer which the face 12 was configured to simulate;

(d) a within face 12 visual consistency as quantified using the coefficient of variation ($c_v$) of color based on stratified random sampling less than a within face 12 visual consistency as quantified using the coefficient of variation ($c_v$) of color based on stratified random sampling of a veneer which the face 12 was configured to simulate;

(e) a within face 12 visual consistency as quantified using the coefficient of variation ($c_v$) of contrast based on stratified random sampling less than a within face 12 visual consistency as quantified using the coefficient of variation ($c_v$) of contrast based on stratified random sampling of a veneer which the face 12 was configured to simulate;

(f) a within face 12 visual consistency as quantified using the coefficient of variation ($c_v$) of luminous intensity ($I_v$) based on stratified random sampling less than a within face 12 visual consistency as quantified using the coefficient of variation ($c_v$) of luminous intensity ($I_v$) based on stratified random sampling of a veneer which the face 12 was configured to simulate; or (g) any combination of two or more of the preceding.

According to certain aspects and embodiments of the present invention, a simulated commodity tropical hardwood-based panels having visual consistencies according to (a), (b), (c), (d), (e), (f), and/or (g) above may be substantially consistent from panel to panel within the same production batch (panel to panel consistency) and/or substantially consistent from panel to panel from different production batches (batch to batch consistency).

Furthermore, a simulated commodity tropical hardwood-based panel may include any one of:

(i) a within face 12 visual consistency as quantified using the coefficient of variation (cv) of color based on random sampling less than a within face 12 visual consistency as quantified using the coefficient of variation (cv) of color based on random sampling of a fancy engineered veneer configured to simulate tropical hardwood;

(ii) a within face 12 visual consistency as quantified using the coefficient of variation (cv) of contrast based on random sampling less than a within face 12 visual consistency as quantified using the coefficient of variation (cv) of contrast based on random sampling of a fancy engineered veneer configured to simulate tropical hardwood;

(iii) a within face 12 visual consistency as quantified using the coefficient of variation (cv) of luminous intensity (Iv) based on random sampling less than a within face 12 visual consistency as quantified using the coefficient of variation (cv) of luminous intensity (Iv) based on random sampling of a fancy engineered veneer configured to simulate tropical hardwood;

(iv) a within face 12 visual consistency as quantified using the coefficient of variation (cv) of color based on stratified random sampling less than a within face 12 visual consistency as quantified using the coefficient of variation (cv) of color based on stratified random sampling of a fancy engineered veneer configured to simulate tropical hardwood;

(v) a within face 12 visual consistency as quantified using the coefficient of variation (cv) of contrast based on stratified random sampling less than a within face 12 visual consistency as quantified using the coefficient of variation (cv) of contrast based on stratified random sampling of a fancy engineered veneer configured to simulate tropical hardwood;

(vi) a within face 12 visual consistency as quantified using the coefficient of variation (cv) of luminous intensity (Iv) based on stratified random sampling less than a within face 12 visual consistency as quantified using the coefficient of variation (cv) of luminous intensity (Iv) based on stratified random sampling of a fancy engineered veneer configured to simulate tropical hardwood; or (vii) any combination of two or more of the preceding.

According to certain aspects and embodiments of the present invention, a simulated commodity tropical hardwood-based panels having visual consistencies according to (i), (ii), (iii), (iv), (v), (vi), and/or (vii) above may be substantially consistent from panel to panel within the same production batch (panel to panel consistency) and/or substantially consistent from panel to panel from different production batches (batch to batch consistency).

To that end, applicant contemplates that practitioners in the building trades would find it easier and more desirable to work with such a simulated commodity tropical hardwood-based panel according to the present invention since variations that are otherwise characteristic of commodity tropical hardwood-based panel may be reduced or eliminated.

Figure 6A:
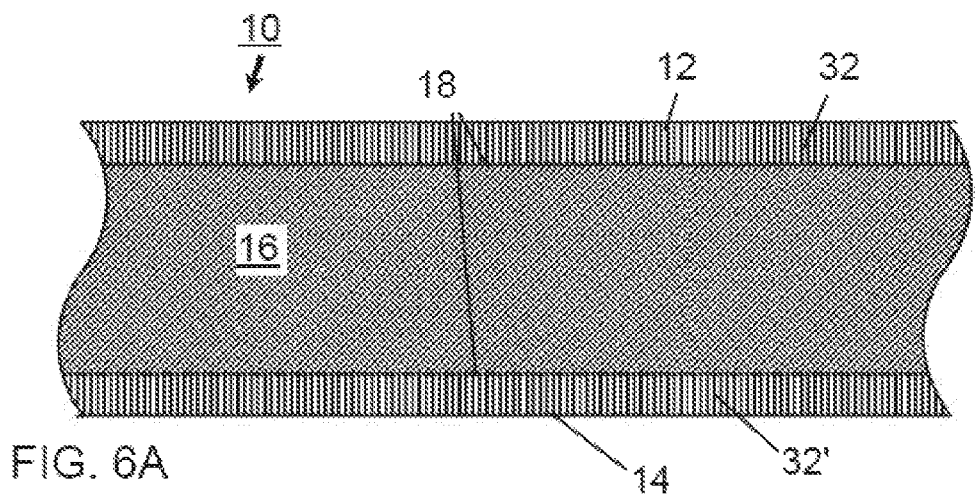
FIG. 6A is a cross-sectional view of a laminate structure that includes an engineered veneer face, an engineered veneer back, and a core according to certain aspects and embodiments of the invention.
Figure 6B:
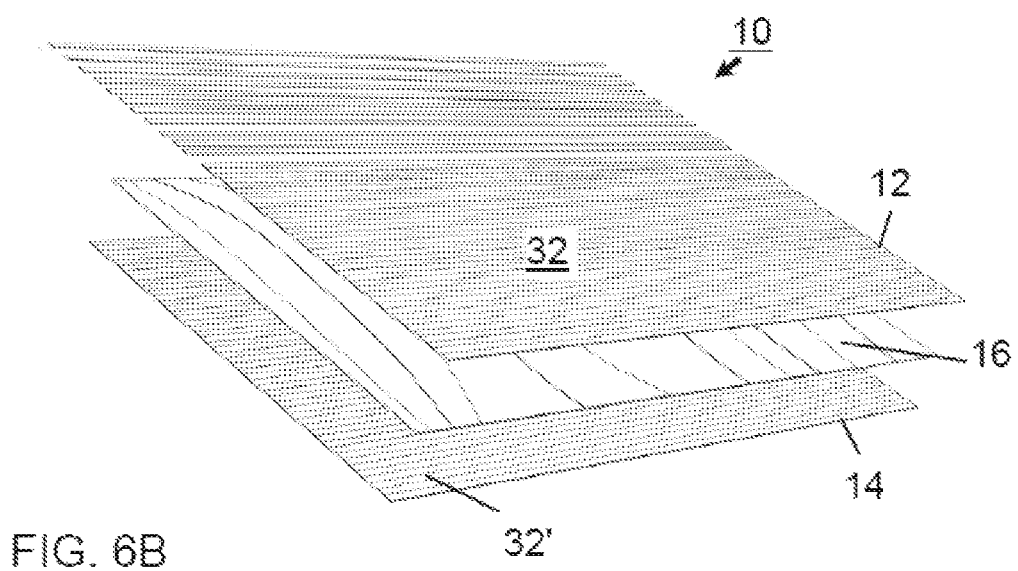
FIG. 6B is a diagram an exploded perspective view of the laminate structure of FIG. 6A.

FIGS. 6A and 6B show a laminate structure 10 including a face 12 and a back 14, both comprised of an engineered veneer 32, and a core 16 according to aspects of embodiment and embodiments of the present invention. The core 16 may be a veneer 24 in a crossband configuration or a plurality of alternated veneers 24, ..., 24$^x$. A laminate structure 10 as shown in FIGS. 6A and 6B, may advantageously include a face 12 and back 14 having less visual variability or more visual consistency as both are comprised of an engineered veneer 32. As noted earlier, it is contemplated that practitioners in the building trades would find it easier and more desirable to work with such a simulated commodity tropical hardwood-based panel as variations that are otherwise characteristic of commodity tropical hardwood-based panel may be reduced or eliminated thereby alleviating variability concerns.

Figure 7A:
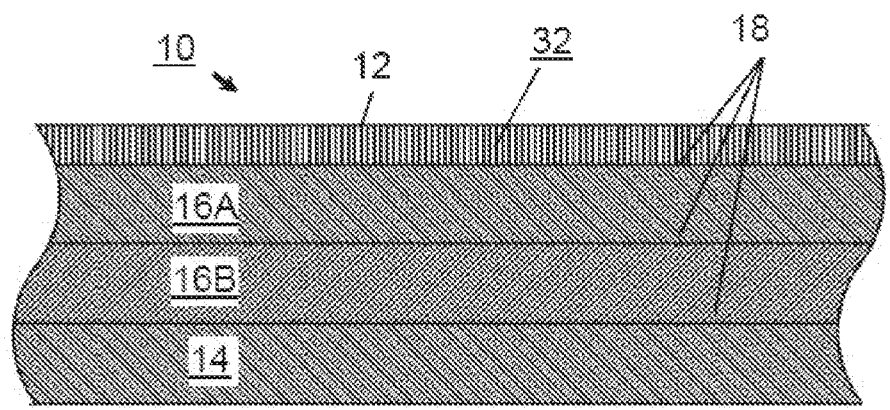
FIG. 7A is a cross-sectional view of a laminate structure including an engineered veneer face, a veneer back in a crossband configuration, and a core including a crossband veneer ply and a veneer ply between the engineered veneer face and the veneer back according to certain aspects and embodiments of the invention.
Figure 7B:
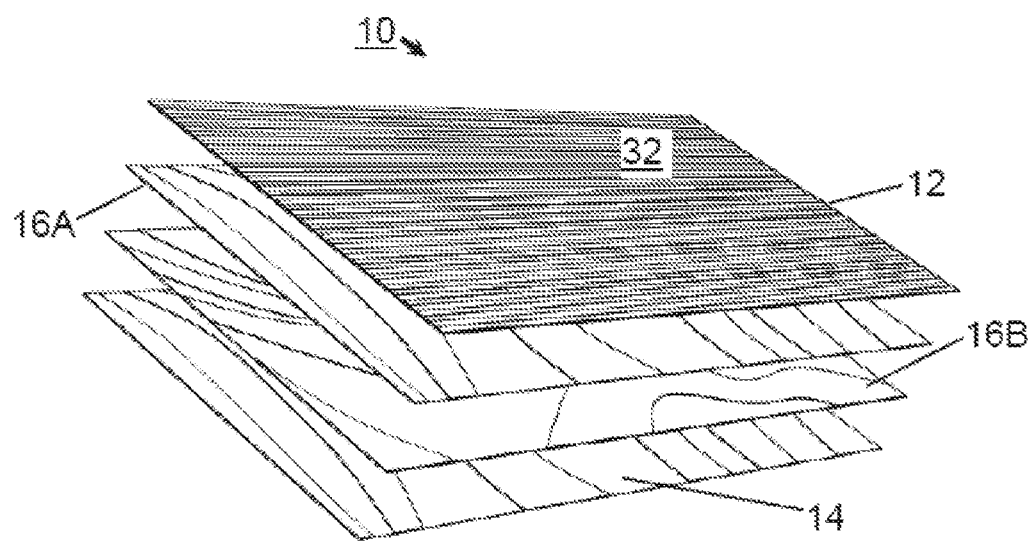
FIG. 7B is an exploded perspective view of the laminate structure of FIG. 7A.

FIGS. 7A and 7B show a laminate structure 10 including a face 12 of an engineered veneer 32 and a back 14 of a veneer 24. Between the face 12 and back 14 are core members or plies 16A and 16B with core member or ply 16A in a crossband configuration. Likewise, those skilled in the art, after having been exposed to and/or having studied the aspects of embodiment and embodiments of the present invention, will appreciate that the back 14 may be in a crossband configuration and that the laminate structure 10 is an unbalanced construction.

Figure 8A:
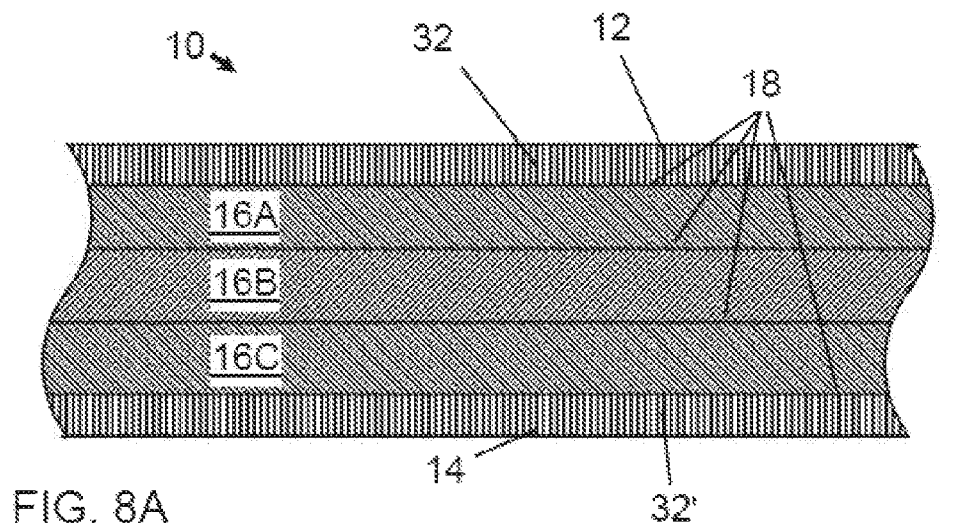
FIG. 8A is a cross-sectional view of a laminate structure including an engineered veneer face, an engineered veneer back, and a core that includes a veneer ply sandwiched between two crossband veneer plies between the engineered veneer face and the engineered veneer back according to certain aspects and embodiments of the invention.
Figure 8B:
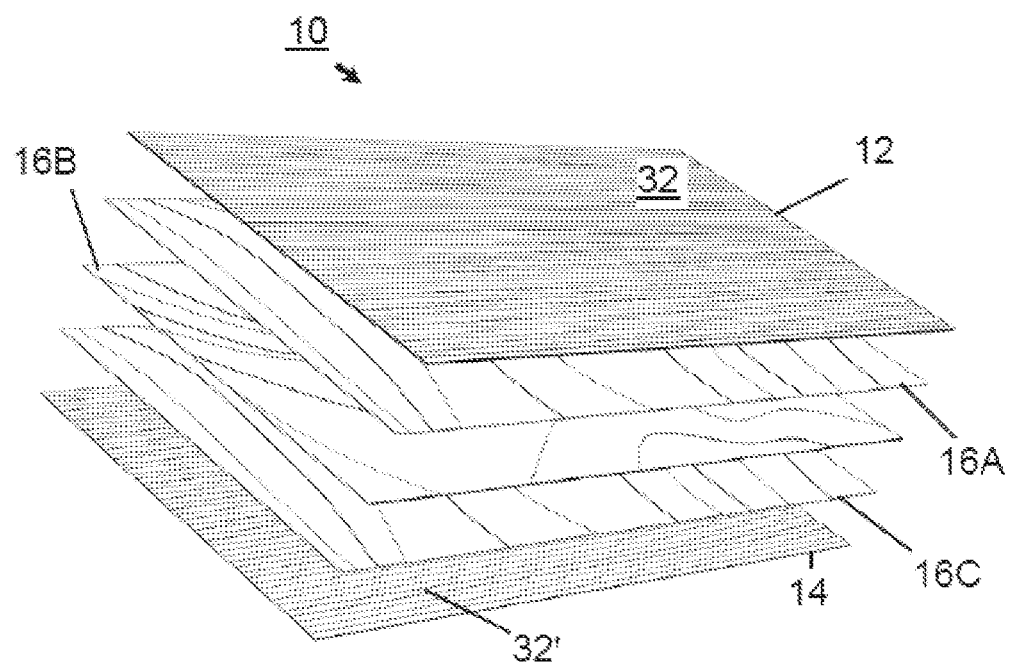
FIG. 8B is an exploded perspective view of the laminate structure of FIG. 8A.

FIGS. 8A and 8B show a laminate structure 10 including a face 12 of an engineered veneer 32, a back 14 of an engineered veneer 32, and a core 16 including core members or plies 16A, 16B, and 16C with core members or plies 16A and 16C in a crossband configuration. Likewise, those skilled in the art, after having been exposed to and/or having studied the aspects of embodiment and embodiments of the present invention, will appreciate that the laminate structure 10 may be in an unbalanced construction.

Figure 9A:
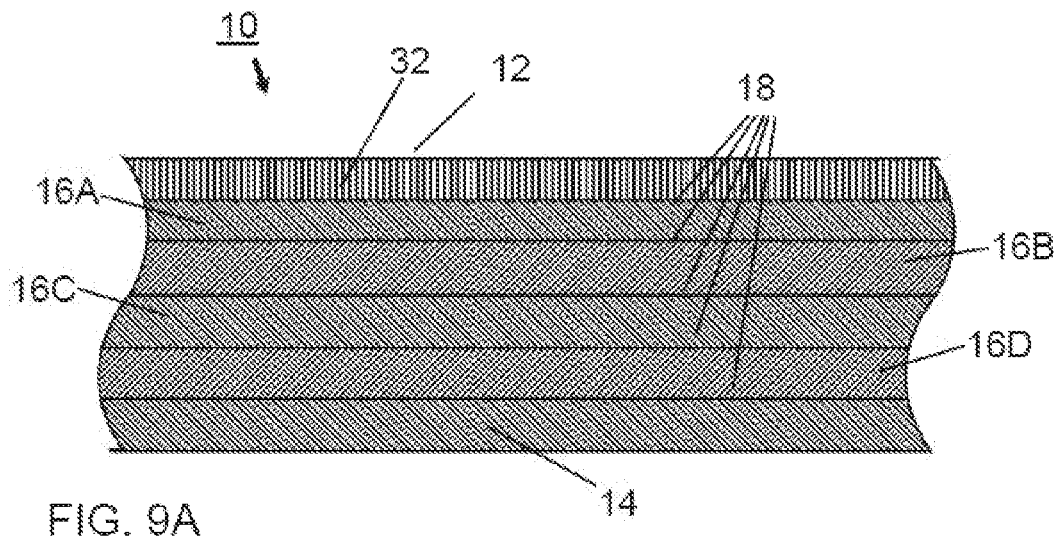
FIG. 9A is a cross-sectional view of a laminate structure including an engineered veneer face, a veneer back, and a core including two crossband veneer plies alternating with two veneer plies between the engineered veneer face and the veneer back according to certain aspects and embodiments of the invention.
Figure 9B:
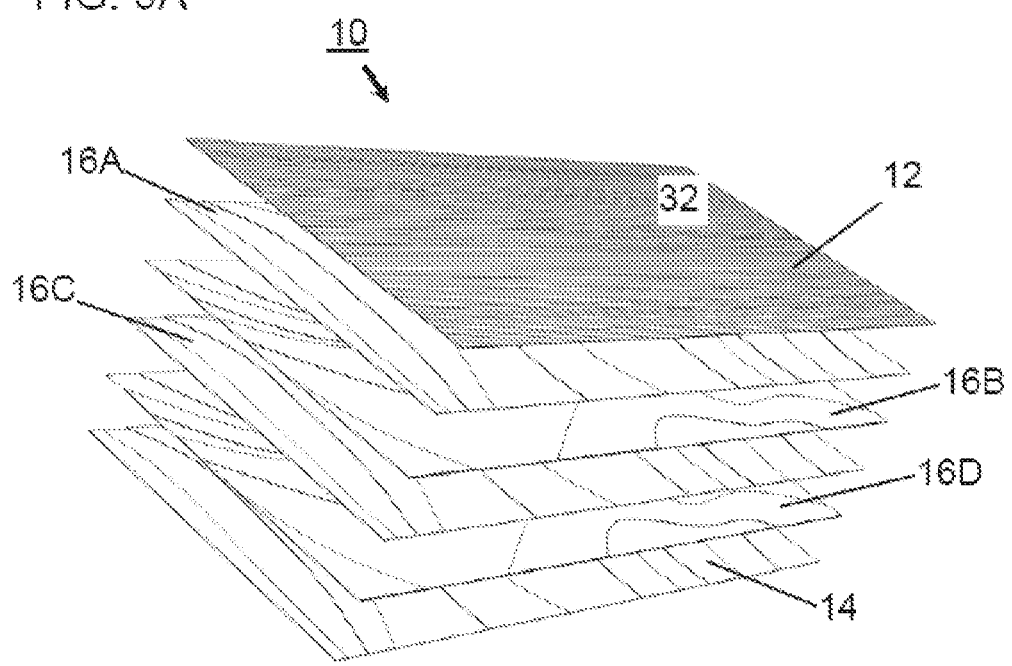
FIG. 9B is an exploded perspective view of the laminate structure of FIG. 9A.

FIGS. 9A and 9B show a laminate structure 10 including a face 12 of an engineered veneer 32, a back 14 of a veneer 24, and a core 16 including core members or plies 16A, 16B, 16C, and 16D with core members or plies 16A and 16C in a crossband configuration. Likewise, those skilled in the art, after having been exposed to and/or having studied the aspects of embodiment and embodiments of the present invention, will appreciate that the back 14 may in a crossband configuration and that the laminate structure 10 is an unbalanced construction.

Figure 10A:
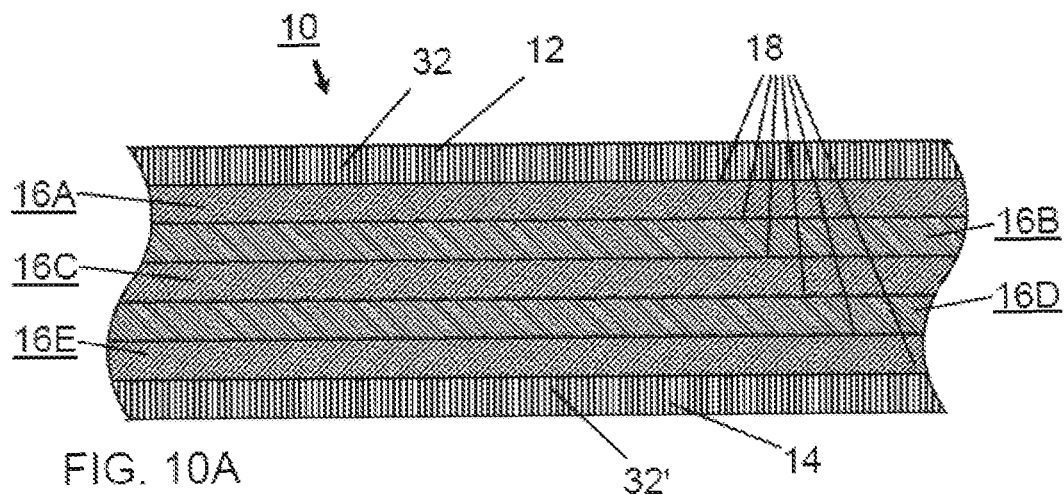
FIG. 10A is a cross-sectional view of a laminate structure including an engineered veneer face, an engineered veneer back, and a core including two veneer plies sandwiched between three crossband veneer plies between the engineered veneer face and the engineered veneer back according to certain aspects and embodiments of the invention.
Figure 10B:
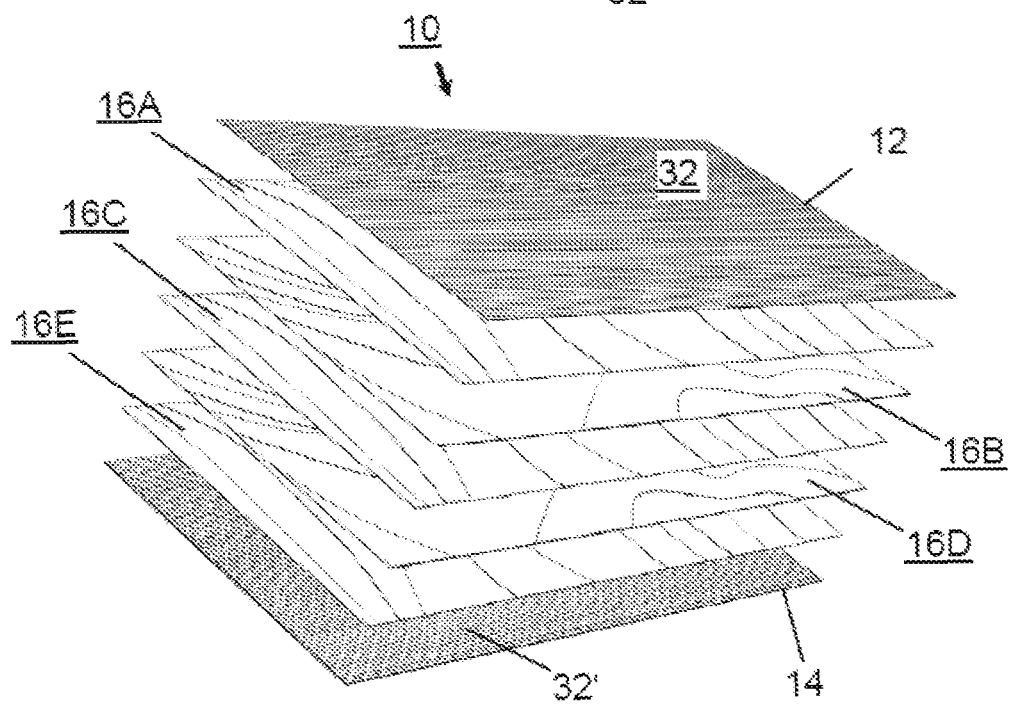
FIG. 10B is an exploded perspective view of the laminate structure of FIG. 10A.

FIGS. 10A and 10B show a laminate structure 10 including a face 12 of an engineered veneer 32, a back 14 of an engineered veneer 32, and a core 16 including core members or plies 16A, 16B, 16C, 16D, and 16E with core members or plies 16A, 16C, and 16E in a crossband configuration. Likewise, those skilled in the art, after having been exposed to and/or having studied the aspects of embodiment and embodiments of the present invention, will appreciate that the laminate structure 10 is a balanced construction.

Figure 11A:
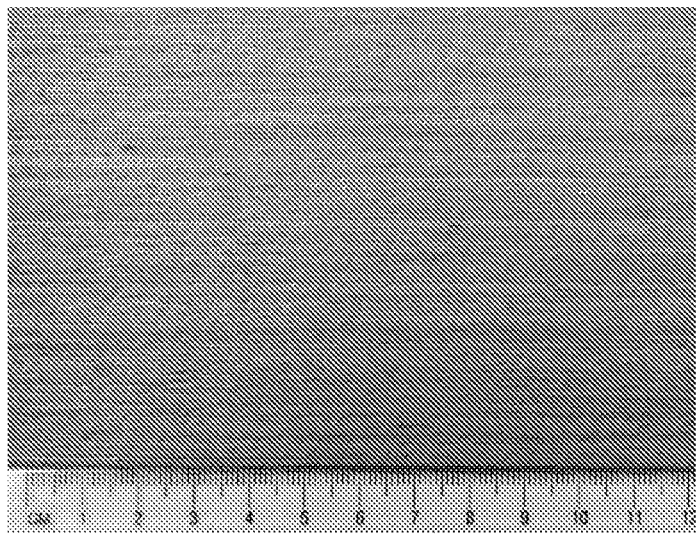
FIG. 11A is a photograph of an engineered veneer face according to certain aspects and embodiments of the invention.
Figure 11B:
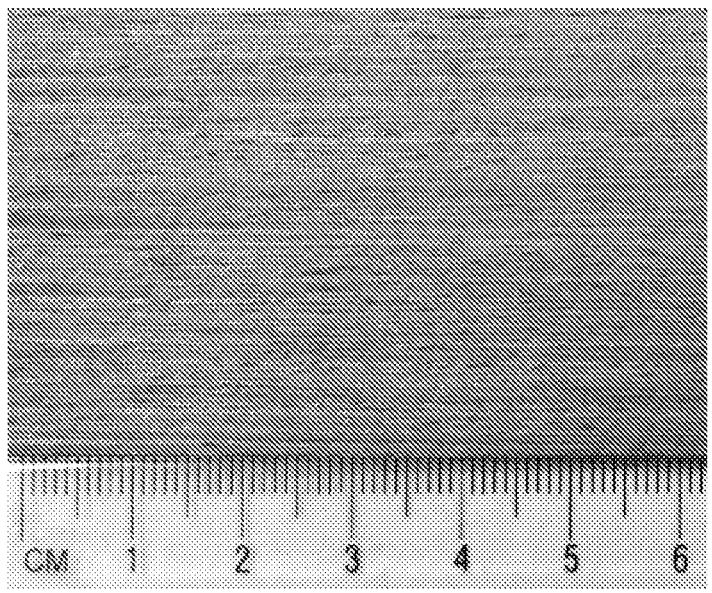
FIG. 11B is a higher magnification photograph of the engineered veneer of FIG. 11A.
Figure 11C:
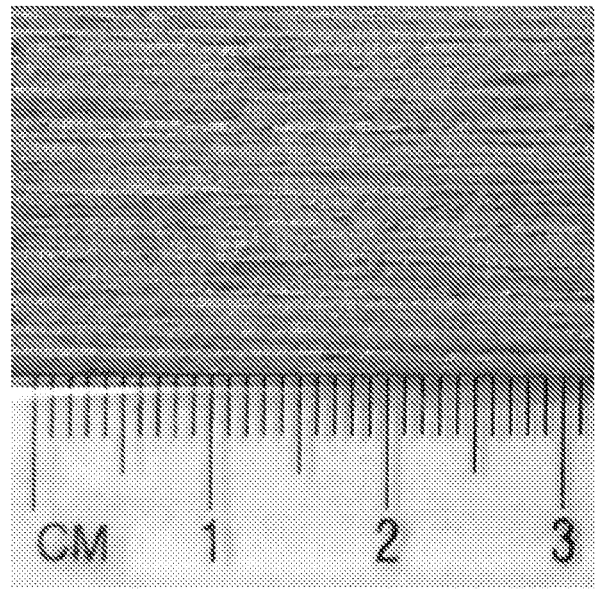
FIG. 11C is another higher magnification photograph of the engineered veneer of FIGS. 11A and 11B.
Figure 12A:
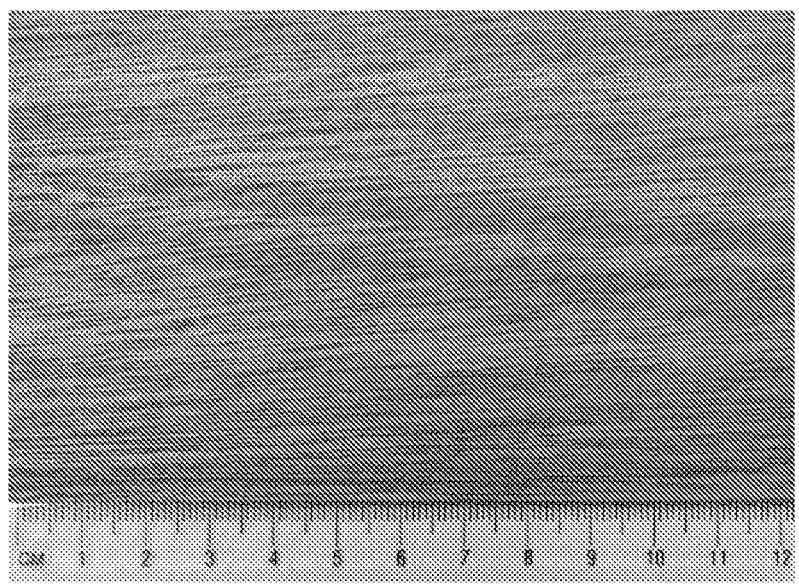
FIG. 12A is a photograph of a Meranti veneer face according to the prior art.
Figure 12B:
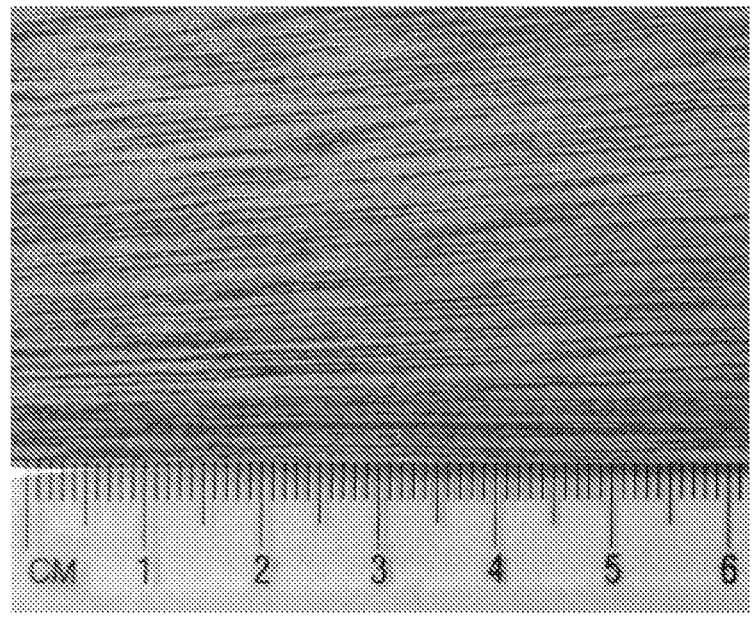
FIG. 12B is a higher magnification photograph of the Meranti veneer face of FIG. 12A.
Figure 12C:
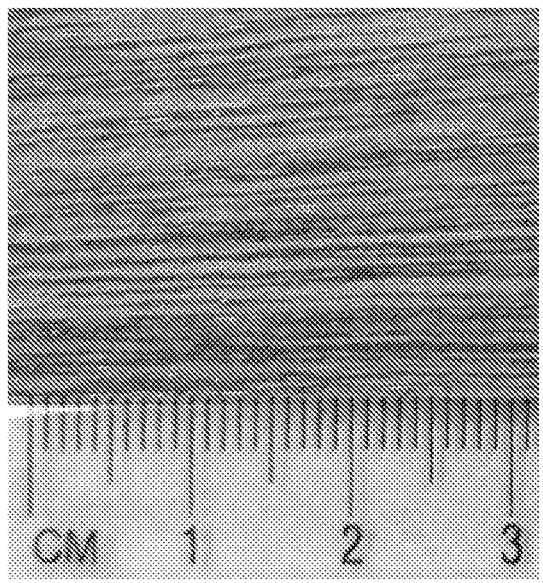
FIG. 12C is another higher magnification photograph of a Meranti veneer face of FIGS. 12A and 12B.
Figure 13A:
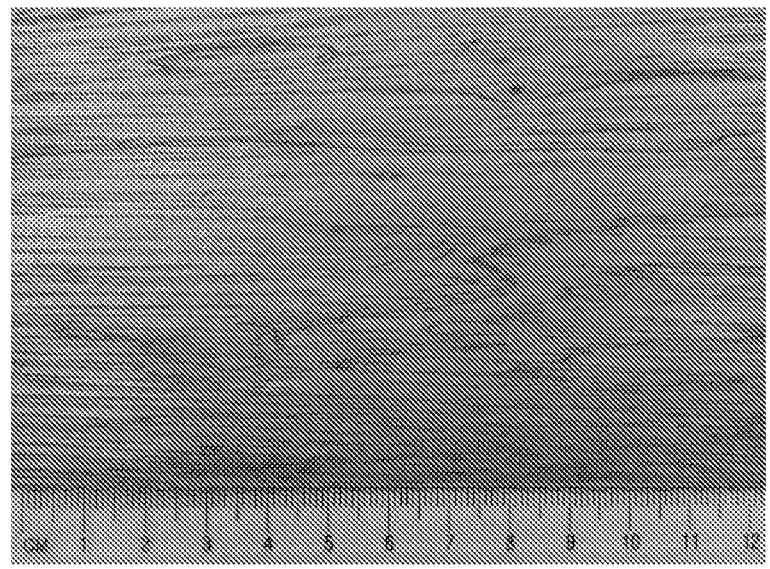
FIG. 13A is a photograph of a Bintangor veneer face according to the prior art.
Figure 13B:
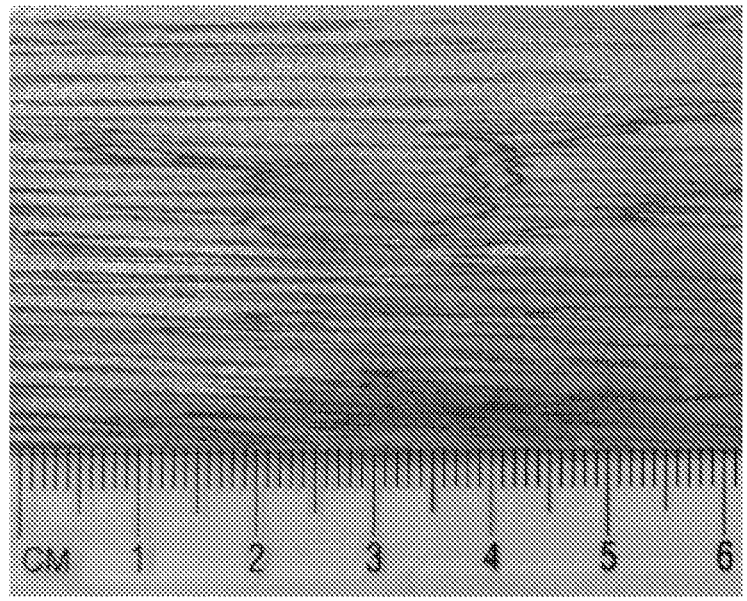
FIG. 13B is a higher magnification photograph of a Bintangor veneer face of FIG. 13A.
Figure 13C:
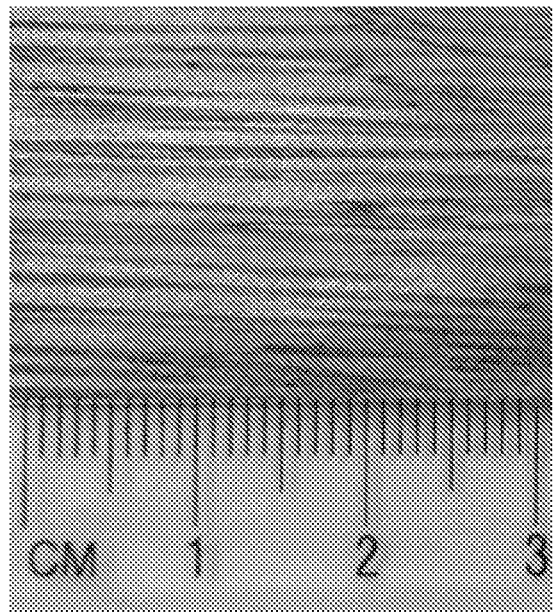
FIG. 13C is another photograph of the Bintangor veneer face of FIGS. 13A and 13B.
Figure 14A:
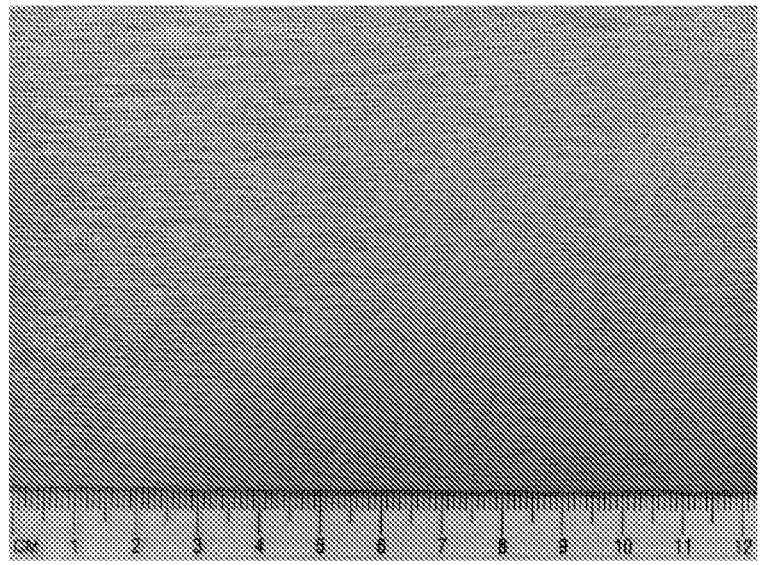
FIG. 14A is a photograph of an Okoume veneer face according to the prior art.
Figure 14B:
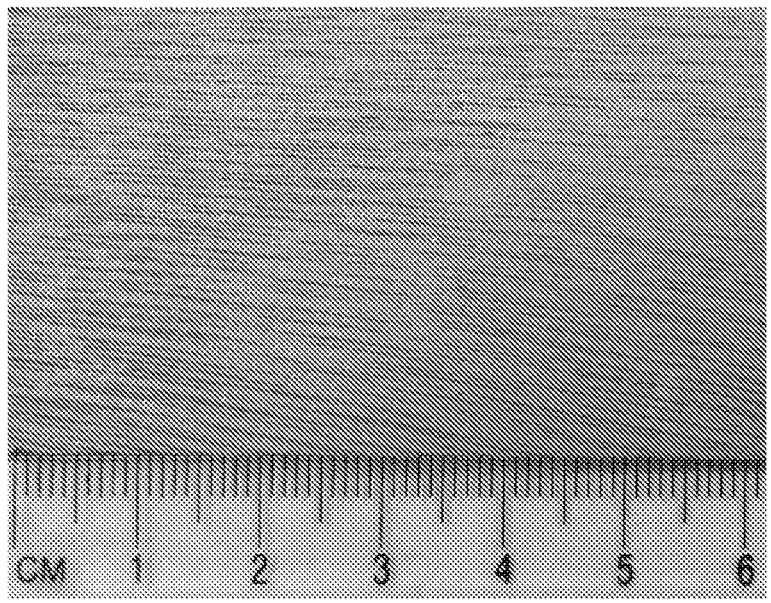
FIG. 14B is a higher magnification photograph of the Okoume veneer face of FIG. 14A.
Figure 14C:
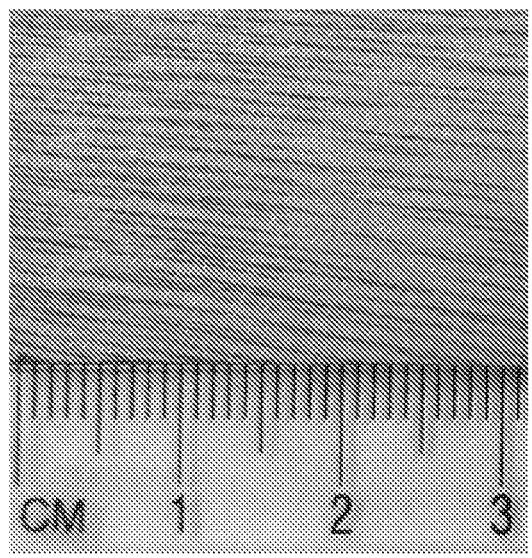
FIG. 14C is another photograph of the Okoume veneer face of FIGS. 14A and 14B.

FIGS. 11A through 11C show photographs of an engineered veneer 32 made using logs from a sustainable source of wood according to aspects of embodiments and embodiments of the present invention. Veneers produced from the logs were bleached and dyed so as to simulate the coloration of a tropical hardwood. FIGS. 12A through 12C are photographs of Meranti veneers of the prior art; FIGS. 13A through 13C are photographs of Bintangor veneers of the prior art; and FIGS. 14A through 14C are photographs of Okoume veneers of the prior art. A comparison of FIGS. 11A through 11C with FIGS. 12A through 14C demonstrates that the visual consistency of a face 10 of a simulated commodity tropical hardwood-based panel made according to certain aspects and embodiments of the present invention is greater than or equal to the visual consistency of a commodity tropical hardwood-based panel of the prior art. By using appropriate stains, bleaching processes or a combination thereof, a simulated commodity tropical hardwood-based panel of the present invention may be tailored to match a coloring of any of a number of tropical woods, and thereby provide familiarity to practitioners in the building trades while at the same time reducing or eliminating the need for commodity tropical hardwood-based panels that include non-sustainable tropical hardwoods.

Moreover by using one or more hardwoods including one or more non-tropical species, one or more plantations species, one or more non-tropical plantations species, or combinations thereof, a simulated commodity tropical hardwood-based panel made according to certain aspects and embodiments of the present invention constitutes a sustainable product that can be made for a cost that is lower than equal to the cost of a commodity tropical hardwood-based panel that it replaces. To that end, those skilled in the art, after having been exposed to and/or having studied the aspects of embodiment and embodiments of the present invention, will appreciate that according to aspects of embodiments and embodiments of the present invention numerous benefits and advantages may be attained including, for example, providing a laminate structure that is sustainable, a laminate structure that does not adversely impact the tropical forests of the world, and a laminate structure that can be manufactured in a more consistent manner.

In operation, a simulated commodity tropical hardwood-based panel may be manufactured using sustainable resources as illustrated by the exemplary processes and products described below.

Process for Manufacturing Simulated Tropical Hardwood Engineered Veneer 32 Capable of Face 12 Usage:

Log Selection for Engineered Veneer:

Hardwood logs are selected from sustainable sources. For example, engineered veneers can be made using poplar (*Populus*) logs, which may be considered a temperate hardwood abundant throughout its natural growth range, capable of being grown on plantations, and thus easily renewable so as to insure sustainability. Once selected, the logs are brought to the mill for processing. The logs can be trimmed, sawed to about 2600 mm lengths, and debarked to ready them for slicing, peeling or sawing into natural veneer. In addition to poplar logs, birch (*Betula* spp.) logs or other logs from one or more sustainable sources of wood can be used to produce the engineered veneer.

Log Slicing, Peeling or Sawing for Engineered Veneer:

The trimmed and sawed logs can be mounted onto a commercially available veneer peeling lathe (model BQ-1120 BQ-270, peeling length of about 1300-2700 mm, peeling diameter of about 100-1600 mm, veneer thickness of about 0.4-3.0 mm made by Yancheng Qingtong Machine CO., Ltd.) and peeled into rotary natural veneers about 0.2 mm thick. This can be achieved by pressing a rotating log towards a large blade, thinly peeling off the log as a continuous sheet of natural veneer about 0.2 mm thick, and slicing the continuous sheet into leaves about 2550 mm long×about 750 mm wide. The natural veneer leaves can be separated for various characteristics. Lower grades of leaves that are not suitable for use in manufacturing the engineered veneer face 12 can be set aside for use as core material.

Optional Natural Veneer Leaf Bleaching for Engineered Veneer:

In some instances, it may be desirable to place the natural veneer leaves into a bleaching vessel containing a commercially available bleach solution comprising a 10 percent solution of Hydrogen peroxide ($H_2O_2$) in water at a temperature of about 60° C. for about 3° hours to remove color pigmentation from the natural veneer and/or color related defects such as mineral streaks, stains, and natural variations.

Natural Veneer Leaf Dyeing for Engineered Veneer:

In the present instance, it may be desirable to dye the natural veneer leaves light red. A water soluble dye formulation can be prepared and can include water, about 0.06 grams/liter yellow dye, about 0.025 grams per liter red dye and about 0.003 grams per liter blue dye. Selected natural veneer leaves can be stacked into a steel cage separated by thin wires to insure that each leaf is completely exposed to the dye water soluble dye formulation. The fully loaded steel cage can be immersed into a vessel and then filled with the water soluble dye formulation. The filled vessel can then be pressurized to about normal atmospheric pressure (about 101 kilopascal (kPa)), heated to a temperature of about 90° C., and held at about 90° C. for about 8 hours to insure that each leaf is sufficiently infiltrated by the dye formulation. Once the desired light red color has been attained, the dyed natural veneer leaves can be unloaded from the vessel.

Natural Veneer Leaf Drying for Engineered Veneer:

Whether bleached or not, the natural veneer leaves can be passed on a wire mesh conveyor belt through a commercially available oven (Model DWF, made by Changzhou Fengqi Drier Equipment Co., Ltd.) set at a temperature of about 100° C. for about 5 minutes to remove excess moisture and dry the natural veneer leaves to a predetermined moisture content (e.g., typically about 8%-16% depending on the species). The predetermined moisture content of the natural veneer leaves can be between about 14%-16%, for example.

Natural Veneer Leaf Gluing for Engineered Veneer:

Approximately 800 dyed natural veneer leaves can be stacked with a layer of a commercially available dyed low formaldehyde emission (LFE) adhesive (sold under the trade name Kaivuan by Kaivuan) between adjacent leaves to create a precursor flitch.

Artificial Flitch Formation for Engineered Veneer:

The precursor flitch can then be placed between the flat dies of a commercially available high pressure press that then pressurized the precursor flitch to about 12 kg/cm$^2$ (about 1.2 MPa) at about room temperature for about 2 hours to bond the leaves together and thereby creating an artificial flitch measuring about 2550 mm long by about 680 mm wide by 660 mm high. This artificial flitch is then substantially ready to be sliced into leaves of engineered veneer.

Formation of Engineered Veneer 32 Capable of Face 12 Usage:

The artificial flitch can be mounted onto a frame of a commercially available veneer slicer (such as a veneer slicer made by Mudanjiang Dongjiang Wood Industries CO. Ltd., for example) so that the bonded natural veneer leaves of artificial flitch strike the knife at a substantially right angle to produce leaves of engineered veneer (about 0.1-0.4 mm thick or, alternatively, about 0.15-0.2 mm thick). The engineered veneer leaves can be collected and properly dried to a water content between about 18% to 20% as required.

Process for Manufacturing Natural Veneers Capable of Core 16 and/or Back 14 Usage:

Log Selection for Core and/or Back:

Hardwood logs are selected from sustainable sources. For example, cores and backs can be made using poplar (*Populus*) logs, which may be considered temperate hardwoods abundant throughout their natural growth range, capable of being grown on plantations, and thus easily renewable so as to insure sustainability. Once selected, the logs can be brought to the mill for processing. The logs can be trimmed, sawed to about 1220 mm lengths, and debarked to ready them for slicing, peeling or sawing into natural veneer. In addition to poplar logs, birch (*Betula* spp.) logs or other logs from one or more sustainable sources of wood can be used to produce the cores and backs.

Log Slicing, Peeling or Sawing for Core and/or Back:

The trimmed and sawed logs can be mounted onto a commercially available veneer peeling lathe (such as model BQ-1120/10A, peeling length of about 1150-2000 mm, peeling diameter of about 125-1000 mm, veneer thickness of about 0.6-4.0 mm made by Yancheng Qingtong Machine CO., Ltd., for example) and peeled into rotary natural veneers. This can be achieved by pressing a rotating log towards a large blade, thinly peeling off the log as a continuous sheet of natural veneer (about 1.3 mm-1.6 mm thick), and slicing the continuous sheet into leaves (about 601 mm long× about 1220 mm wide). The natural veneer leaves can be separated for various characteristics. Lower grades of leaves that are not suitable for use as back 14 can be set aside for use in core 16.

Optional Natural Veneer Leaf Bleaching for Core and/or Back:

In some instances, it may be desirable to place the natural veneer leaves into a bleaching vessel containing a commercially available bleach solution comprising a 10 percent solution of H2O2 in water at a temperature of about 60° C. for about 3° hours to remove color pigmentation from the natural veneer and/or color related defects such as mineral streaks, stains, and natural variations.

Natural Veneer Leaf Dyeing for Core and/or Back:

In the present instance, it may be desirable to dye the natural veneer leaves light red, for example. A water soluble dye formulation can be prepared and can include water, about 0.06 grams/liter yellow dye, about 0.025 grams per liter red dye and about 0.003 grams per liter blue dye. Selected natural veneer leaves can be stacked into a steel cage separated by thin wires to insure that each leaf is completely exposed to the dye water soluble dye formulation. The fully loaded steel cage can be placed into a vessel which can then be filled with the water soluble dye formulation. The filled vessel can then be pressurized to about normal atmospheric pressure (about 101 kilopascal (kPa)), heated to a temperature of about 90° C., and held at about 90° C. for about 8 hours to insure that each leaf is sufficiently infiltrated by the dye formulation. Once the desired light red color has been attained, the dyed natural veneer leaves can be unloaded from the vessel.

Natural Veneer Leaf Drying for Core and/or Back:

Whether bleached or not, the natural veneer leaves can be passed on a wire mesh conveyor belt through a commercially available oven (such as model DWF, made by Changzhou Fengqi Drier Equipment Co., Ltd., for example) set at a temperature of about 100° C. for about 5° minutes to remove excess moisture and dry the natural veneer leaves to a predetermined moisture content (e.g., typically about 8%-14% depending on the species). In the case of the dyed natural veneer leaves, the predetermined moisture content can be between about 16%-18%.

Process for Manufacturing Commodity Grade Simulated Tropical hardwood-based Panel:

Plywood Substrate Construction:

Four dyed natural veneer leaves from step 2 can be provided to a commercially available production line including: (i) a panel feeder, (ii) a brush machine, (iii) an adhesive spreader, (iv) a disc table, (v) a press, and (vi) inspection conveyor configured to produce nominally about 1220 mm wide×about 2440 mm long×about 5.2 mm thick (4'×8'×13⁄64") plywood substrates. The back layer of the plywood substrate can include a "CC" or better natural veneer leaf from step 2. The core of the plywood substrates can include three (3) layers of "BB" or better natural veneer leaves from step 2. The grain directions of the back layer and core layer leaves can be alternated so as to be substantially perpendicular in contiguous layers. Commercially available low formaldehyde emission (LFE) adhesive (sold under the trade name Huada by Huada) can be used to bond the contiguous layers.

Plywood Substrate Sizing:

The plywood substrates of step 3 (a) can then be trimmed using a commercially available trim line for panel sizing including: (i) a plywood substrates feeder, (ii) a width tenoner, (iii) a 90 Degree transfer, and (v) a length tenoner configured to size the nominally about 1220 mm wide×about 2440 mm long×about 5.2 mm thick (4'×8'×13⁄64") plywood substrates.

Plywood Substrate Sanding:

The sized plywood substrates of step 3 (b) can then be sanded using a commercially available sanding line for panel sizing including: (i) head sander cross belt, pad, pad, pad, (ii)

a plywood substrate rotator, and (iii) a head sander cross belt, pad, cross belt, pad, pad. The sanding line can finish the back layers of the plywood substrates to ensure that they have a quality of "CC" or better.

Finishing Commodity Grade Simulated Tropical hardwood-based Panel Completion:

An engineered veneer leaf from step 1 can be applied to a sized plywood substrate of step 3 (c) using a commercially available production line including: (i) a panel feeder, (ii) a brush machine, (iii) an adhesive spreader, (iv) a disc table, (v) a press, and (vi) inspection conveyor configured to finish the nominally about 1220 mm wide×about 2440 mm long×about 5.2 mm thick (4'×8'×13/64") plywood panels. The face of the plywood panel can include an engineered veneer leaf from step 1 having the adhesive lines and end grain of the natural veneer leaves aligned substantially parallel with the long side of the plywood panels and perpendicular to the surface of the plywood panel. Commercially available low formaldehyde emission (LFE) adhesive (sold under the trade name Huada by Huada) can be used to bond the engineered veneer leaf to the sized plywood substrate thereby completing the commodity grade simulated tropical hardwood-based panel.

Characterizing within face visual consistency of a wooden board and/or a wood-based panel may be determined using:

(a) a color sensing based mechanism and associated sensors;

(b) a luminous intensity based mechanism and associated sensors;

(c) an image contrast based mechanism and associated sensors; or (d) combinations thereof.

A color sensing based mechanism and associated sensors entail color measurement. Any color is a mixture of three (3) colors in different quantities, Red, Blue and Green (RBG). A color sensor absorbs light from an object to be characterized and convert that data into a digital form. Luminous intensity (Iv) based mechanism entails measuring the wavelength-weighted power emitted by a light source in a particular direction. Image contrast based mechanism entails measuring a difference in the color and brightness of an object and other objects within the same field of view. The table below provides information about different characterization mechanism capable of being configured to quantify within face visual consistency and corresponding commercially available sensors for performing such characterization.

Different Characterization Mechanism Capable of Being Configured to Quantify within Face Visual Consistency and Associated Sensors

| | Characterization Mechanism | | | |
|---|---|---|---|---|
| | Image Contrast | Color | Color | Luminous Intensity (Iv) |
| | | | Associated Sensor | |
| | Banner R55E color sensor | EMX ColorMax 100 0-7-4 color sensor | TAOS TCS230-DB color sensor kit | Keyence LV-21AP sensor |
| Sensor Supplier | Banner Engineering Corporation, Minneapolis, MN, USA | EMX Industries, Inc. (EMX Inc.), Cleveland, Ohio, USA | Texas Advanced Optoelectronic Solutions, Incorporated (TAOS Inc.) Plano, TX, USA | Keyence Corporation of America Woodcliff Lake, NJ, USA |
| Supplier Internet Resource | http://info.bannersalesforce.com/xpedio/groups/public/documents/literature/59574.pdf | http://www.emxinc.com/colormax.html#colormaxdata | http://www.taosinc.com/getfile.aspx?type=press&file=tcs230-db_doc.pdf | http://www.keyence.com/services/download.php?file=lv_general_ka.pdf&fs=LV-H64&done=/products/sensors/laser/laser.php |
| Type of Sensor | Analog | Analog | Digital (color sensor) | Digital |
| Range operations height "h" | about ¼ inch to about ¾ inch | about 1½ inches to about 3 inches | about 1 inch to about 2 inches | up to about 25 inches |
| Integration to other software | Easy | Easy | Not easy | Easy |
| Area covered in every reading | Small area | Small area | Small area | Complete board width possible |

Some noteworthy characteristics for the sensors of the able bale include:

Range:

The measurement range affects the resolution of the sensor. An increased range will decrease the resolution, but will result in an increase in the sensing area. Both factors are to be considered when determining sensing parameters, as well as the usefulness of the sensor for a specific application.

External Light: Sensors often are disturbed by external/ambient light. However, modern sensors have been developed that are designed to overcome effect of external light.

Angle "θ" of measurement:

(Often an angle "θ" of measurement is kept substantially at about 0 degrees with respect to the normal to a surface from which readings are being taken. With the Banner, TAOS and Keyence sensors, an angle "θ" up to about 15 degrees may be possible to observe same readings from (FIG. 1: i.e., angle "θ" may range from substantially at about 0 degrees to about 15 degrees to the normal {Y-axis in FIG. 15A} to a surface).

To compare the within face visual consistency between two sample sets, manual sampling measurements may be conducted in a random fashion (see FIG. 15B) and/or stratified random fashion (see FIG. 15C). As illustrated FIG. 15A, the angle "θ" of the sensor while measurements are being taken may be between about 0 to about 15 degrees to the normal of the surface of the face. However, it is desirable that once an angle "θ" is selected that it be kept substantially constant while measurements are being taken within a sample face and from sample to sample. Likewise, it is desirable that the distance height "h" from the sample face surface to the sensor be kept substantially constant while measurements are being taken. As illustrated FIG. 15B, random sampling from locations within a face of a sample surface involves generating coordinates within a face of the sample using a pseudo random number generator (simple random sampling). As illustrated FIG. 15C, stratified random sampling involves dividing a face of the sample into homogenous subgroups and then taking a simple random sample within each face subgroup.

Relevant Statistics and Definitions

The sample mean is the average and is computed as the sum of all the observed outcomes from the sample divided by the total number of events.

$$\bar{x} = \frac{1}{n}\sum_{i=1}^{n} x \quad \text{Eq. 1}$$

Where: $\bar{x}$=mean
n=number of observed outcomes (sample size)
x=observed value The variance and standard deviation are indicators of the spread or distribution of the data.

$$s^2 = \frac{1}{n-1}\sum_{i=1}^{n}(x-\bar{x})^2 \quad \text{Eq. 2}$$

Where: $s^2$=variance
And $$s=\sqrt{s^2} \quad \text{Eq.3}$$

Where: s=standard deviation

Furthermore, the dispersion of the data around the mean is also given by the coefficient of variation. It is a useful statistic for comparing the degree of variation from one data series to another, even if the means are drastically different from each other.

$$c_v = \frac{s}{\bar{x}} * 100 \quad \text{Eq. 4}$$

Where: $c_v$=Coefficient of variation

Determination of Sample Size

Calculation of an appropriate sample size depends upon a number of factors unique to each population and it is down to you to make the decision regarding these factors. The three most important are:

How accurate you wish to be.
How confident you are in the results.
What budget you have available.

When sample data is collected and the sample mean is calculated, that sample mean is typically different from the population mean. This difference between the sample and population means can be thought of as an error. The margin of error is the maximum difference between the observed sample mean and the true value of the population mean and is given by the following equation (assuming that n will be greater than 30):

$$E = z_{\frac{\alpha}{2}} \frac{s}{\sqrt{n}} \quad \text{Eq. 5}$$

Where: E=Margin of error $z_{\frac{\alpha}{2}}$ = Critical value

If n is smaller than or equal to 30, a Student t Distribution should be used. For a 95% confidence level (most commonly used), the critical value is 1.96. It is equal to 2.58 for a confidence level of 99%, and 1.64 for 90%.

Measurement Outcomes

There are two ways of comparing the amount of variation present between two data sets. Assuming that there are an equal number of samples measured, the coefficient of variation of the two sample sets can be compared. This method is, however, adequate only for rough comparisons and cannot be statistically validated without further comparisons. Evaluating the cv is, however, a useful tool for in house testing to monitor operational and manufacturing efficiencies.

A valid statistical test to compare the uniformity of two data sets (comparer the variances) is an F test. In particular, we will investigate whether two variances are different. In this case, it is natural to write down the null and alternative hypotheses:

$H_0: s_1^2 = s_2^2$ $H_1: s_1^2 \neq s_2^2$

Note that the alternative hypothesis can have the inequality ">" if we are interesting in showing that the first population has a larger variance than the second. By convention, $s_1^2$ will always be the larger of the two sample variances.

$$F = \frac{s_1^2}{s_2^2} \quad \text{Eq. 6}$$

with n−1 degrees of freedom for both the numerator and denominator. The corresponding P-values can then be read from an F-distribution table and compared to the right tailed area corresponding to the way the null hypothesis is stated.

Software

A number of the above analyses may be carried out using software provided by the sensor vendors and/or commercially available software, such as, SigmaScan image analysis software package available from Aspire Software International, Ashburn, Va., USA (http://www.aspiresoftwareintl.com/html/sigmascan_pro.html)

Other than in the operating examples, or where otherwise indicated, all numbers expressing quantities of ingredients, reaction conditions, and so forth used in the specification and claims are to be understood as being modified in all instances by the term "about," Accordingly, unless indicated to the contrary, the numerical parameters set forth in the following specification and attached claims are approximations that may vary depending upon the desired properties sought to be obtained by an aspect of an embodiment and/or embodiments of the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

The above descriptions of various exemplary embodiments of the invention have been set forth for the purpose of illustrating various aspects and features of the invention, and are not intended to limit the invention thereto. Persons skilled in the art will recognize that certain modifications and adaptations can be made to the described embodiments without departing from the spirit and scope of the invention. All such modifications and adaptations have been excluded herein for the sake of conciseness and readability, and are properly within the scope of the appended claims.

Features from one embodiment or aspect may be combined with features from any other embodiment or aspect in any appropriate combination. For example, any individual or collective features of method aspects or embodiments may be applied to apparatus, product or component aspects or embodiments and vice versa.

The invention claimed is:

1. A method of producing a simulated commodity tropical hardwood-based plywood panel comprising:
   cutting a plurality of natural veneers from wood from one or more sustainable sources of wood;
   whitening, dyeing, or whitening and dyeing the natural veneers such that each natural veneer has a coloring that is substantially similar to the coloring of a selected commodity tropical hardwood veneer different from the wood from one or more sustainable sources of wood;
   forming an engineered face veneer:
      the engineered face veneer comprising a plurality of stacked and adhered elongated strips cut from the plurality of natural veneers, wherein the wood grain in each of the wood strips extends substantially along a length of the strip,
      the length of each elongated strip is sufficient to extend continuously along one of a length and a width of the plywood panel,
      the engineered face veneer has a thickness from about 0.1 mm to about 0.8 mm, which corresponds to the width of each of the elongated strips, and
      a surface of the engineered face veneer is composed from the edges of the plurality of strips and an adhesive therebetween;
   adhering the engineered face veneer and two or more stacked wood plies comprising one or more hardwoods from one or more sustainable sources of wood, the two or more stacked wood plies being arranged in a cross-band, to form the simulated commodity tropical hardwood-based plywood panel.

2. The method of claim 1 comprising cutting the plurality of natural veneers from a non-tropical species of hardwood, a plantations species of hardwood, a non-tropical plantations species of hardwood, or a combination thereof.

3. The method of claim 1 further comprising measuring the visual consistency of the engineered face veneer.

4. The method of claim 1 wherein the selected commodity tropical hardwood veneer is a lauan veneer.

5. The method of claim 2, comprising cutting the plurality of natural veneers from a temperate hardwood or a boreal hardwood.

* * * * *